US006853937B2

(12) United States Patent
Shibusawa et al.

(10) Patent No.: US 6,853,937 B2
(45) Date of Patent: Feb. 8, 2005

(54) SOIL CHARACTERISTICS SURVEY DEVICE AND SOIL CHARACTERISTICS SURVEY METHOD

(75) Inventors: Sakae Shibusawa, Fuchu (JP); Atsushi Ohtomo, Mashiki-machi (JP); Shinichi Hirako, Kyoto (JP)

(73) Assignee: Tokyo University of Agriculture and Technology TLO Co., Ltd., Tokyo (JP)

( * ) Notice: Subject to any disclaimer, the term of this patent is extended or adjusted under 35 U.S.C. 154(b) by 0 days.

(21) Appl. No.: 10/189,357

(22) Filed: Jul. 3, 2002

(65) Prior Publication Data

US 2003/0009286 A1 Jan. 9, 2003

(30) Foreign Application Priority Data

Jul. 6, 2001 (JP) ........................................ 2001-207139

(51) Int. Cl.[7] ................................................. G01V 5/00
(52) U.S. Cl. ........................... 702/100; 37/348; 250/253
(58) Field of Search ....................... 702/100, 5; 356/73, 356/446; 700/245; 37/348; 701/50; 405/143

(56) References Cited

U.S. PATENT DOCUMENTS

| 5,025,150 | A | * | 6/1991 | Oldham et al. | ............. | 250/253 |
| 5,044,756 | A | * | 9/1991 | Gaultney et al. | ........... | 356/446 |
| 5,659,985 | A | * | 8/1997 | Stump | ......................... | 37/348 |
| 6,608,672 | B1 | * | 8/2003 | Shibusawa et al. | ........... | 356/73 |
| 6,671,582 | B1 | * | 12/2003 | Hanley | ...................... | 700/245 |

FOREIGN PATENT DOCUMENTS

| JP | 11-299351 | | 11/1999 | |
| JP | WO 01/04627 A1 | | 7/2000 | |
| WO | WO 20000 54566 | * | 9/2000 | ........... A01B/70/00 |

OTHER PUBLICATIONS

Patent Abstracts of Japan, Publication No. 11–299351 dated Nov. 2, 1999, 1 pg.

* cited by examiner

Primary Examiner—John Barlow
Assistant Examiner—Victor J. Taylor
(74) Attorney, Agent, or Firm—Osha & May L.L.P.

(57) ABSTRACT

To provide a soil characteristics survey device capable of efficiently acquiring high precision data information about the distribution of soil characteristics in an agricultural field, and managing the data information collectively.

The soil characteristics survey device is composed of a pedestal connected to the rear of the tractor, a control unit (a computer) mounted on the pedestal, and a soil excavating unit attached below the rear end of the pedestal. While being towed by a vehicle 2 such as a tractor, the device surveys in real time the distribution of soil characteristics in a given agricultural field. At the top of the control unit is attached a GPS antenna. The soil excavating unit 50 is composed of a shank 51 connected to the bottom of the pedestal and a sensing unit which is fixed so the bottom of the shank 51 and advance in the soil approximately parallel to the ground at a predetermined depth. The control unit 30 generates data information groups corresponding to the same soil samples, concerning soil characteristics to be detected or the detection signals of differently arranged sensors 57, 53, 61, 62, 63, 64, and the like.

12 Claims, 20 Drawing Sheets

SOIL CHARACTERISTICS SURVEY DEVICE AND SOIL CHARACTERISTICS SURVEY METHOD

BACKGROUND OF THE INVENTION

1. Field of the Invention

The present invention relates to a soil characteristics survey device and a soil characteristics survey method for surveying characteristics of a given soil, and more specifically, to a soil characteristics survey device which is used to collect information about the special distribution of soil characteristics within an agricultural field.

2. Description of the Background Art

In recent years, in an attempt to preserve the environment and improve profitability, precision agriculture has become a popular way to minimize the amount of investment required to purchase agricultural material, fertilizer, and feed to be consumed per unit area of the agriculture field.

In the precision agriculture, a comparatively large-scaled agricultural field is divided into plural sections, and these sections are individually managed with regard to fertilization or spraying agricultural chemicals, while taking different soil characteristics in the respective sections (variations in soil characteristics) into consideration.

In performing such precision agriculture, it is necessary to obtain information that accurately reflects the variations in the soil characteristics from section to section.

For example, the device disclosed in U.S. Pat. No. 5,044,756 is towed by a vehicle or the like and moves through the soil approximately horizontally at a predetermined depth. As it advances, the device projects light with a fixed wavelength into the soil and detects the reflected light, thereby surveying organic materials and water contained in the soil in real time qualitatively and quantitatively, based on characteristics of the reflected light.

The information corresponding to the respective sections is used to find the appropriate method for managing the soil characteristics in the individual section (including determination of the amount of fertilizer or agricultural chemicals to be given) by being compared with data information accumulated in the past or data information about other agricultural fields geographically different. Therefore, it is preferable that the data information corresponding to the respective sections is standardized (has a unified standard) so that it can be compared with data information about soil characteristics obtained from regions different in time and geography. In order to standardize the data information, plural parameters (variables) reflecting physical and chemical features of the soil can be adopted and expressed mathematically (as functions) so as to be used as indicators to evaluate the soil characteristics. When soil characteristics are evaluated in terms of superiority in agricultural production, essential parameters to define the soil characteristics include the clay content in the soil, the soil concentration, and so on, besides the amount of organic material or water (water content) contained in the soil to be surveyed by the above-mentioned device.

The parameters such as the clay content or the soil concentration are greatly affected by physical features of the soil (such as hardness or electric conductivity), and also it is difficult to find the quantity by an optical analyzing method. Consequently, it becomes necessary to use sensors having the function of detecting hardness and electric conductivity of the soil.

However, in the case where sensors having different detection principles are adopted to detect plural parameters at the same time, these sensors may detect various characteristics about the soil at sites apart from each other because of restrictions in installing positions and other reasons. For this, it cannot be certain that the various characteristics detected belong to the same sample.

In order to find the distribution of soil characteristics in an agricultural field, if parameters reflecting soil features are directly measured (detected) in the field, as in the above-mentioned device, it is likely that the relation between a detecting element and a sample (soil) has external perturbations. For example, in the case where detection is done by making the detecting element get in contact with the soil, it is likely that the contact pressure between the detecting element and the soil fluctuates, whereas in the case where detection is done by making the detecting element get out of contact with the soil, it is likely that the distance between the detecting element and the soil fluctuates. These external perturbations cause a decrease in the precision or reproducibility of obtained data.

SUMMARY OF THE INVENTION

In view of the above-described conditions, the present invention has an object of providing a soil characteristics survey device which can efficiently acquire high precision data information about the distribution of soil characteristics in a given agricultural field and control the acquired data information collectively.

In order to achieve the above object, the device of the present invention is a soil characteristics survey device for surveying soil characteristics comprising: a soil excavator for excavating and moving into a given soil while making its excavating surface get in contact with the soil at a given depth, and forming a survey space near the rear end of the soil excavator. A detecting device, a distance sensing device, and a distance corresponding device, wherein the detecting device measures characteristics of the soil on a survey surface which is at an interface between the survey space and the soil; the distance sensing device measures the distance from the detecting device to the survey surface; and the distance corresponding device performs an information processing on the soil characteristics detected by the detecting device, according to the distance measured by the distance sensing device.

According to this structure, information about the soil characteristics detected by the detecting device can be processed in accordance with the distance recognized by the recognizing device. As the result, data information to be obtained when, e.g., the distance from the detecting device to the survey surface is equal (when the requirements are in the optimum range) can be acquired and grouped. Consequently, high precision and highly reproducible data information can be obtained about the soil characteristics detected by the detecting device (a characteristic for which the distance between the detecting element and the detection target is important as the decisive requirement for the analysis precision, e.g., optical characteristics of the soil such as optical spectra of the light reflected from the soil).

The distance corresponding device preferably comprises: an unevenness recognizing device for recognizing unevenness of the soil excavating surface, based on the distance recognized by the distance recognizing device. A grouping processor for grouping information about the soil characteristics detected by the detecting device, based on the unevenness recognized by the unevenness recognizing device.

The grouping of the information about the soil characteristics can be the process of selecting (extracting), as a highly practical group, information obtained when the unevenness is in an advantageous condition as a detecting condition of the soil characteristics by the detecting device.

When the distance is recognized for the predetermined number of times within the predetermined section including the survey points of the soil characteristics, it is possible to adopt indicators such as the mean value or variance (a standard deviation) of the recognized distance, or the asymmetry of unevenness estimated by fluctuations of the recognized distance in order to group the information, while taking any or all of these indicators into consideration.

This structure makes it possible to manage, as the same group, information about the soil characteristics detected on soil surfaces having similar unevenness or on soil surfaces having preferable unevenness. As the result, high precision and highly reproducible data information can be obtained about the soil characteristics detected by the detecting device (a characteristic for which the distance between the detecting element and the detection target is important as the decisive requirement for the analysis precision).

The soil characteristics to be detected by the detecting device preferably include optical characteristics based on the light reflected from the survey surface.

Another device of the present invention is a soil characteristics survey device for surveying characteristics comprising: a soil excavator for excavating, moving into a given soil while making its excavating surface get in contact with the soil at any given depth, and a detecting device for detecting electric characteristics of the soil in contact with the excavating surface. The electric characteristics include electric conductivity, electric resistance, electric capacity, and dielectric constant.

The detecting element (e.g., electrode element) of the detecting device for detecting the electric conductivity is preferably provided near the tip of the soil excavator.

In this structure, the electric conductivity or dielectric constant of the soil in contact with the excavating surface of the soil excavator can be detected directly and successively, which makes it possible to acquire precise data information in a wide area, about electric characteristics of the soil and various other characteristics of the soil related to the electric characteristics (having a correlation with the electric characteristics).

The detecting device at least includes a pair of electrodes which are exposed to the excavating surface and isolated from each other.

The detecting device may include a voltage applier for applying an alternating voltage of the predetermined frequency to the pair of electrodes.

There is no electric reaction generated on the surface of the electrodes, thereby being unlikely to change the characteristics of the output signals with time or over years. This enables highly reliable detection values to be constantly obtained for a long period of time, concerning the detection of the electric conductivity and dielectric constant of the soil.

The voltage applier may comprise: a first voltage applier for applying an alternating voltage of the predetermined frequency to the pair of electrodes, and a second voltage applier for applying an alternating voltage of a different frequency from the alternating voltage applied to the pair of electrodes by the first voltage applier.

According to this structure, the electric conductivity of the soil in contact with the excavating surface of the soil excavator can be acquired by measuring characteristics of the current flowing inside the predetermined circuit based on the alternating voltage applied by the first voltage applier. In addition, other electric characteristics (e.g., dielectric constant) of the soil in contact with the excavating surface of the soil excavator can be acquired by measuring characteristics of the current flowing inside another circuit based on the alternating voltage applied by the second voltage applier. Consequently, the pair of electrodes allows acquisition of plural different electric characteristics about the soil in contact with the excavating surface of the soil excavator.

Another device of the present invention is a soil characteristics survey device for surveying characteristics comprising: a soil excavator for excavating and moving into a given soil while making its excavating surface get in contact with the soil at any given depth and a detecting device for detecting a force acting opposite to the direction of movement when the soil excavator moves.

According to this structure, it is possible to detect the load or the soil pressure (resistance) that the soil present ahead of the soil excavator gives to the excavating surface (the tip portion in particular) of the soil excavator through a force acting opposite to the direction of movement of the soil excavator. This soil pressure has a high correlation with the hardness of the soil. Thus the hardness of the soil present ahead can be detected sequentially with the advancement of the soil excavator.

It becomes unnecessary to provide a sensor element on or near the excavating surface (front surface) of the soil excavator in order to detect the soil pressure, like a diaphragm pressure-sensitive element which directly detects the soil pressure (resistance) received from the soil ahead. In other words, the space between the excavating surface of the soil excavator and the detecting element of the distortion detecting device is made comparatively thick to secure sufficient durability against an impact to the excavating surface of the soil excavator or the wearing away of the excavating surface.

Another device of the invention is a soil characteristics survey device for surveying characteristics of comprising: a soil excavator for excavating and moving into a given soil while making its excavating surface get in contact with the soil at any given depth, and forming a survey space on the opposite side of the direction of movement of the excavating surface, a detecting device, a detecting condition recognizing device, and a group information generator, wherein the detecting device measures the characteristics of at least one of the soil on the survey surface which is on the interface between the survey space and the soil and the soil in contact with the excavating surface. The detecting condition recognizing device recognizes detecting conditions when the detecting device detects characteristics of plural locations of soil and the group information generator generates groups of data information corresponding to nearly the same soil samples about the characteristics of the plural locations of soil based on the detecting conditions recognized by the detecting condition recognizing device.

The "nearly the same soil" includes not only exactly the same soil but also soil surfaces (the soil of the outer layer) facing each other, out of the soil excavated by the soil excavator. Also, "detecting conditions" may include difference in arrangement of the sensor elements for detecting the respective parameters.

According to this structure, the plural pieces of data obtained in any given survey points as the detection values about the soil characteristics can be merged accurately and efficiently as information corresponding to nearly the same soil sample. As a result, helpful information for generating a data map with high universality to express the geographical distribution of the characteristics of the soil in a wide area can be collected efficiently.

The detecting conditions recognized by the detecting condition recognizing device preferably includes a timing at which the characteristics of the plural locations of soil are detected and the rate of movement of the soil excavator.

According to this structure, the plural parameters can be merged accurately and efficiently as information corresponding to the same soil sample.

The characteristics of the soil on the survey surface preferably include optical and thermodynamic characteristics of the soil, e.g., at least one of infrared-light spectra, visible-light spectra, photo images, temperatures, and the like.

The detecting device preferably detects both the characteristics of the soil on the survey surface and the soil in contact with the excavating surface. The characteristics of the soil in contact with the excavating surface preferably include electric and dynamic characteristics of the soil, e.g., at least one of hardness or electric characteristics of the soil.

The detecting device preferably detects the characteristics of the soil on the survey surface and the soil in contact with the excavating surface from nearly the same soil sample.

It is preferable that the soil characteristics survey device further comprises a comparator for comparing based on the characteristics of at least one of the soil on the survey surface and the soil in contact with the excavating surface, reliability of the characteristics of the other. The "reliability of the characteristics" indicates the reliability of the characteristics detected by the detecting device.

According to this structure, it is possible to quantitatively acquire the same soil characteristics based on two different characteristics such as the water content or organic material content of the soil correlated with the soil characteristics, thereby improving the reliability of the data information acquired by the soil characteristics.

The same soil characteristics referred to in this case indicate not only exactly the same characteristics but also nearly the same soil characteristics and similar soil characteristics.

It is preferable that the soil characteristics survey device further comprises: communicator and processor, wherein the communicator acquires information about the current position of the soil characteristics survey device as external communication information, and the processor processes the communication information and the soil characteristics detected by the detecting device as mutually related data information.

According to this structure, data information about soil characteristics obtained in each survey point can be acquired and managed efficiently as being corresponded to the accurate position in the agricultural field.

A soil characteristics survey method of the present invention comprises the steps of: excavating and moving into a given soil while making the excavating surface get in contact with the soil at any given depth, and forming a survey space on the opposite side of the direction of movement of the excavating surface and processing information about characteristics of the soil on the survey surface which is on the interface between the survey space and the soil detected by a detecting device according to the distance from the detecting device to the survey surface.

According to this method, information about the soil characteristics detected by the detecting device can be processed in accordance with the distance. As the result, data information to be obtained when, e.g., the distance from the detecting device to the survey surface is equal (when the requirements are in the optimum range) can be acquired and grouped. Consequently, high precision and highly reproducible data information can be obtained about the soil characteristics detected by the detecting device (a characteristic for which the distance between the detecting element and the detection target is important as the decisive requirement for the analysis precision, e.g., optical characteristics of the soil such as optical spectra of the light reflected from the soil).

Another soil characteristics survey method of the present invention comprises the steps of: excavating and moving into a given soil while making an excavating surface get in contact with the soil at any given depth, and detecting electric characteristics of the soil in contact with the excavating surface. The electric characteristics referred to in this case include electric conductivity, electric resistance, electric capacity, and dielectric constant.

According to this method, the electric conductivity or dielectric constant of the soil in contact with the excavating surface can be detected directly and successively, which makes it possible to acquire precise data information in a wide area, about electric characteristics of the soil and various other characteristics of the soil related to the electric characteristics (having a correlation with the electric characteristics).

Further another soil characteristics survey method of the present invention comprises the steps of: excavating and moving into a given soil while making an excavating surface get in contact with the soil at any given depth, and detecting a force acting opposite to the direction of movement of the excavating surface.

According to this method, it is possible to detect the load or the soil pressure (resistance) that the soil gives to the excavating surface through a force acting opposite to the direction of movement of the excavating surface. This soil pressure has a high correlation with the hardness of the soil. Thus the hardness of the soil present ahead can be detected sequentially with the advancement of the excavating surface.

Each of the aforementioned structures can be combined as much as possible.

DESCRIPTION OF THE PREFERRED EMBODIMENTS

First Embodiment

The first embodiment as an example of the soil characteristics survey device of the present invention will be described as follows with reference to the drawings.

[Survey System Overview]

Figure 1:
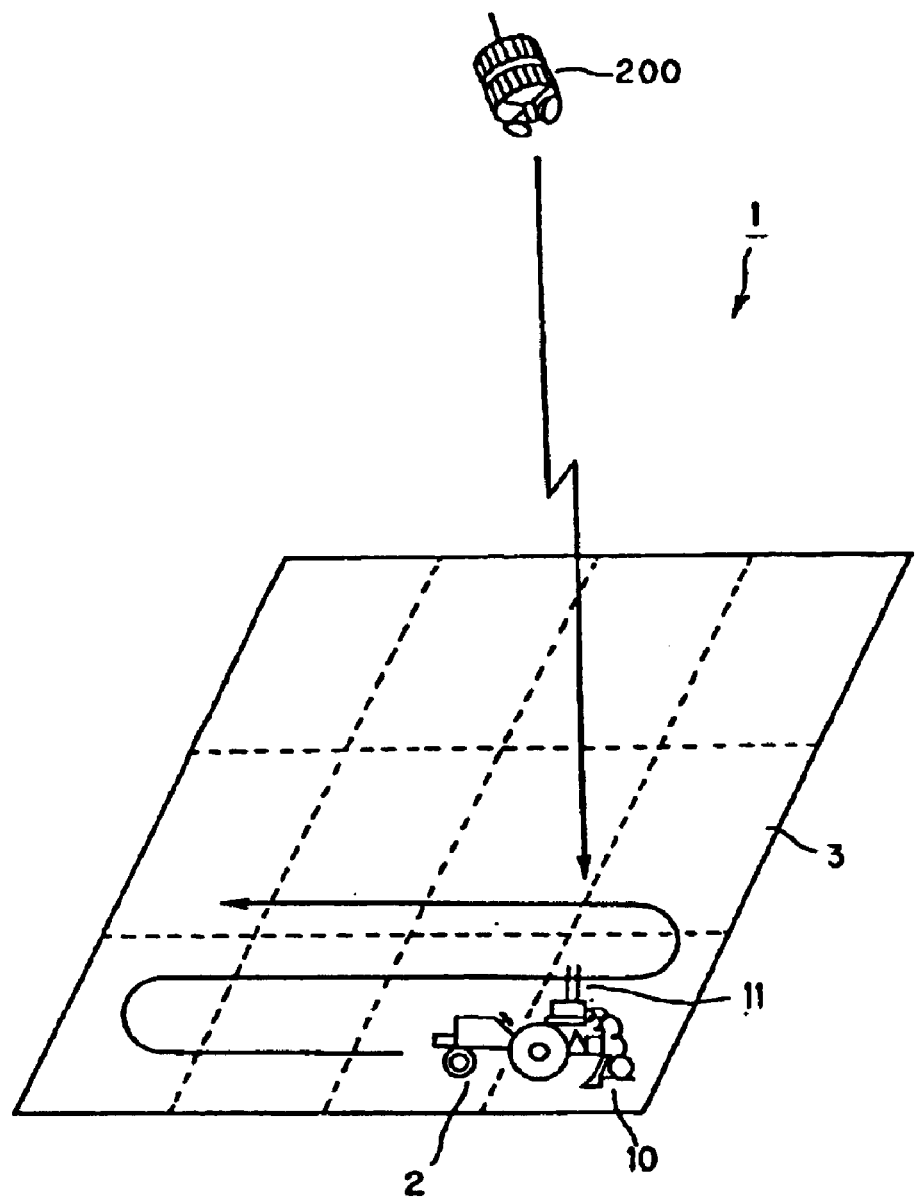
FIG. 1 shows the diagrammatic structure of the survey system of the first embodiment of the present invention.

FIG. 1 shows the diagram of surveying system of the present embodiment in outline.

As shown in FIG. 1, a survey system 1 is composed of a soil characteristics survey device 10 which is towed by a vehicle 2 such as a tractor and moves across an agricultural field 3 cultivated to produce crops, and a GPS (Global Positioning System) satellite which keeps precice track of the device 10. The soil characteristics survey device 10 is equipped with a GPS antenna 11 through which the device 10 receives a position information (about the position of the device 10 on the ground) signal from the GPS satellite 200, thereby recognizing the current position of its own. As shown in dashed lines in FIG. 1, the agricultural field 3 is imaginarily divided into plural sections, and management of obtained data about soil characteristics and determination of the amounts of fertilizer and agricultural chemicals to be given in producing crops are done individually from section to section.

[Structure and Function of the Soil Characteristics Survey Device]

The structure and function of the soil characteristics survey device will be described as follows.

Figure 2:
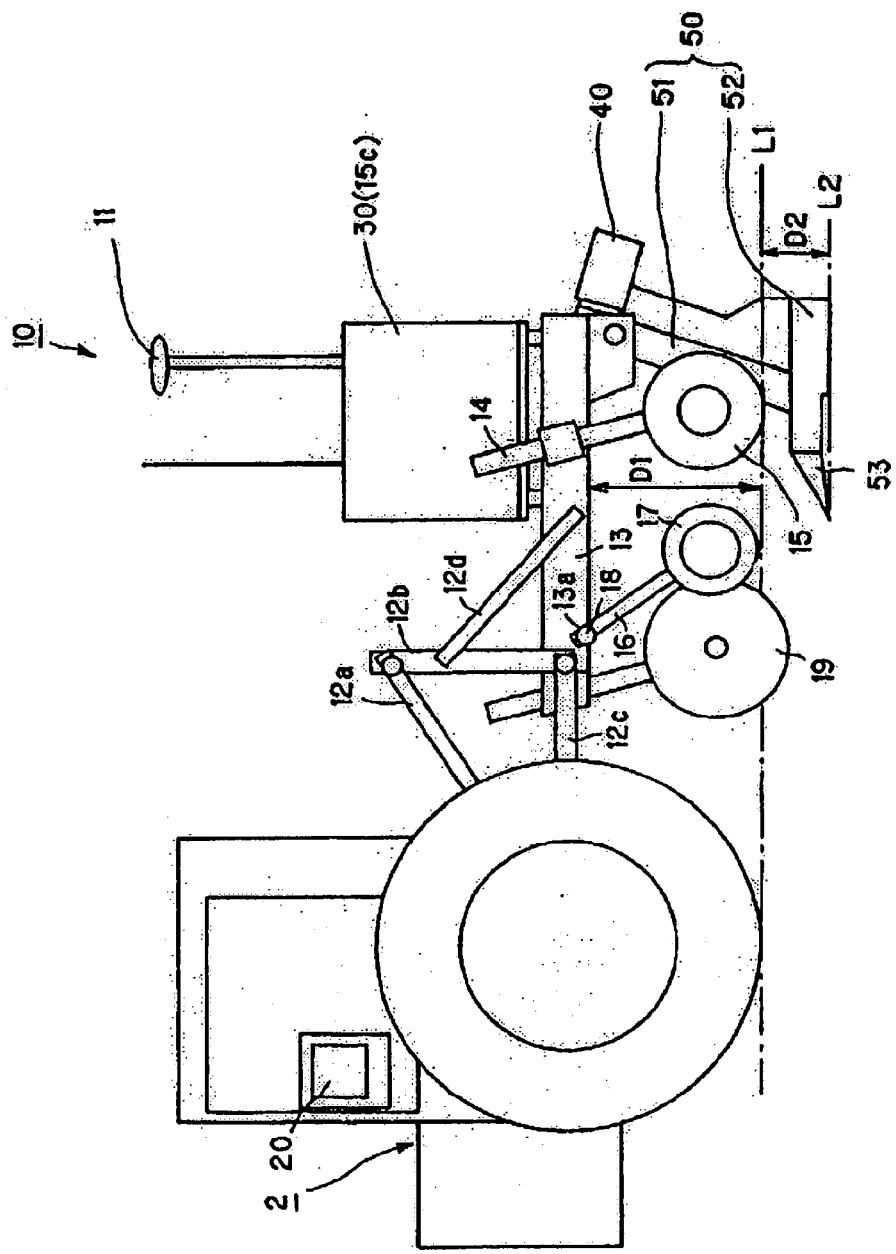
FIG. 2 shows a diagrammatic side view of the soil characteristics survey device of the same embodiment.

FIG. 2 shows a diagrammatic sectional side view of the soil characteristics survey device 10 which is towed by a vehicle 2 such as a tractor.

As shown in FIG. 2 the soil characteristics survey device 10 is composed of a pedestal 13 connected to the rear of the tractor 2 via support frames 12a, 12b, 12c, and 12d; a control unit (including a computer) mounted on the pedestal 13; and a soil excavating unit 50 attached below the rear end of the pedestal 13. At the top of the control unit 30 is attached the GPS antenna 11. The soil excavating unit 50 is composed of a shank 51 connected to the bottom of the pedestal 13 and a sensing unit 52 which is fixed to the bottom of the shank 51 and advances approximately parallel to the ground (under the ground) at a predetermined depth. The shank 51 has a V-shaped tip in the direction of movement in order to reduce the resistance received from the soil, and its sensor unit is provided with a chisel blade (chisel unit) 53 at its tip for excavating the soil, and further provided with different types of sensors (not illustrated) built therein for surveying soil characteristics. A halogen lamp 40 attached outside the soil excavating unit 50 functions as a light source for illuminating the target (soil) to be surveyed in a survey space (not illustrated) inside the sensing unit 52 by sensors (not illustrated) which will be described later. A support arm 14 fixed on a side of the pedestal 13 makes a gage wheel 15 provided at its end get in contact with the ground so as to keep the pedestal 13 parallel to the ground in cooperation with the support frames 12a, 12b, 12c, and 12d. The distance between the gage wheel 15 and the pedestal 13 is adjustable, which enables the position (depth) of the sensing unit 52 in the soil to be adjusted. Similarly, a rotation arm 16, which is attached on the side of the pedestal 13 ahead of the support arm 14 so as to rotate around a predetermined portion 13a, makes a depth-measuring free wheel 17 attached at the end thereof get in contact with the ground. At the position where the rotation arm 16 is fixed, there is a potentiometer (rotation angle sensor) 18 which outputs signals in accordance with the rotation phase of the rotation arm 16 with respect to the pedestal 13. Based on the output signals of the rotation angle sensor 18, the distance D1 between the ground surface of the depth-measuring free wheel 17 and the pedestal 13, and the distance between the bottom of the sensing unit 52 (soil survey surface) and the ground surface L1, that is, the depth D2 of a soil survey surface L2 are found. A coltar 19 provided at the tip of the pedestal 13 cuts the ground surface ahead of the soil excavating unit 50, thereby mitigating the force (the resistance that the soil excavating unit 50 receives from the soil) needed to guide the sensing unit 52 under the ground. The coal tar 19 also cuts straws and weeds to prevent them from twining around the shank 51. A display manipulating unit 20 installed on the tractor 2 is electrically connected to the control unit 30, and communicates with the control unit 30 either through an inputting operation of the operator or automatically, thereby displaying, e.g., data information stored in the control unit 30.

[Structure of Sensing Unit]

Figures 3A, 3B:
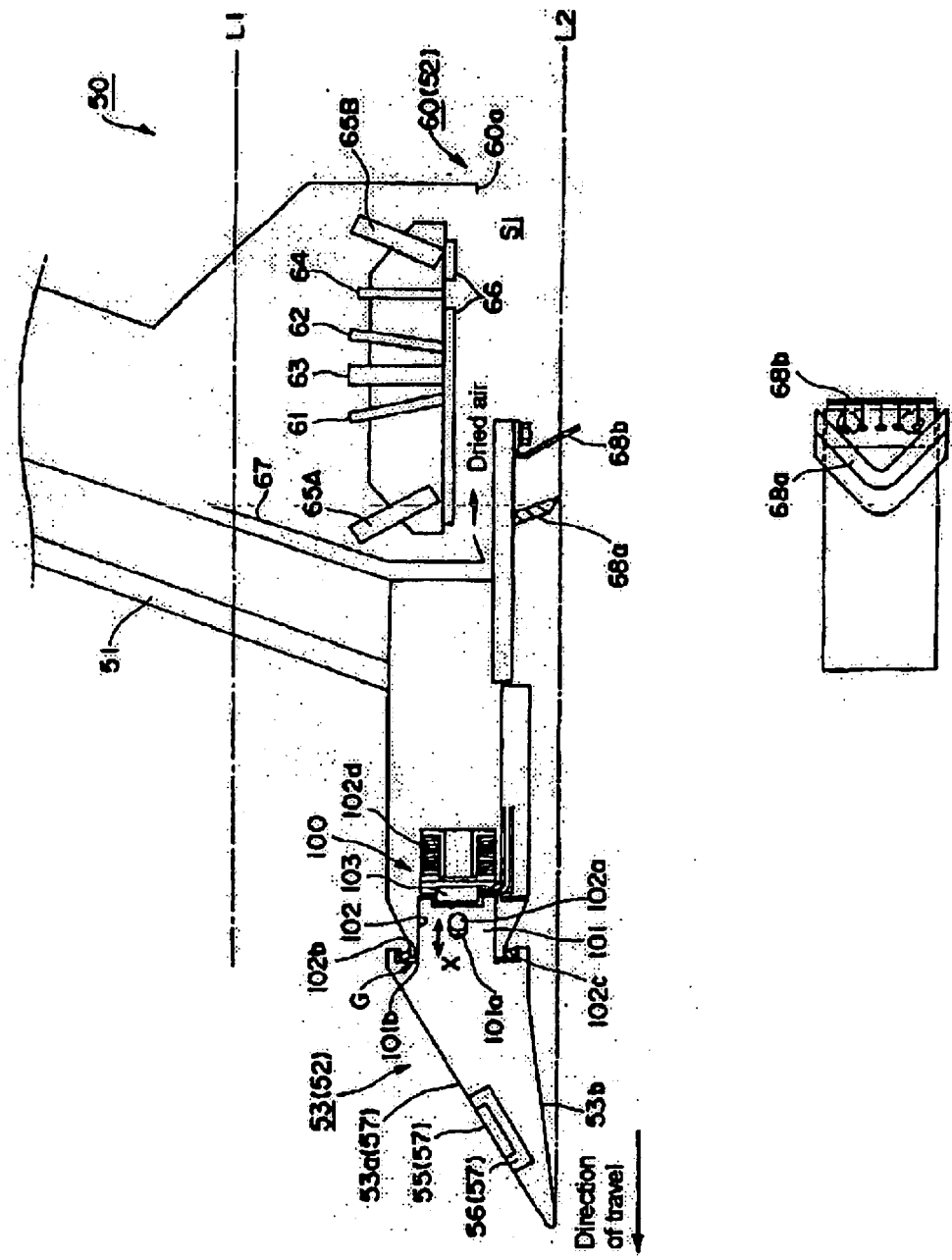
FIGS. 3A and 3B show a diagrammatic cross sectional side view of the internal structure of the sensing unit of the soil characteristics survey device of the same embodiment.

FIG. 3A shows a diagrammatic cross sectional side view of the internal structure of the sensing unit.

As shown in FIG. 3A the sensing unit 52 is composed of the chisel unit 53 corresponding to its front end in the direction of movement and an optical sensor housing unit 60 corresponding to its rear end (the other side of the front end) The chisel unit 53 advances while excavating the soil ahead of its blade edge vertically, thereby forming the soil survey surface L2 behind, to be parallel to the ground surface L1. The optical sensor housing unit 60 contains a visible-light collecting fiber (visible-light sensor) 61, a near-infrared-light collecting fiber (infrared-light sensor) 62, a CCD (Charge Coupled Device) camera 63, a temperature sensor 64, and illuminating optical fibers 65A, 65B. These members 61–65 are arranged to be apart from the soil survey surface L2, thereby forming a predetermined survey space S1 between the members 61–65 and the soil survey surface L2. The optical sensor housing unit 60 has a rear unit 60a that is open (the back of the survey space S1 is open to outside) so as not to keep soil inside the unit 60 (in the back of the survey space S1).

The illuminating optical fibers 65A, 65B allows the light in a specific wavelength range (e.g., 400 to 2400 nm or so) to pass through them, out of the light supplied from the halogen lamp 40 (refer to FIG. 2), and project the light on the soil survey surface L2. The visible-light sensor 61 selectively collects light in a visible-light wavelength range (e.g., 400 to 900 nm) out of the reflected light which is projected on the soil survey surface L2 by the illuminating optical fibers 65A, 65B. The infrared-light sensor 62 selectively collects light in a near-infrared light wavelength range (e.g., 900 to 1700 nm) out of the reflected light which is projected on the soil survey surface L2 by the illuminating light fibers 65A, 65B. The CCD (Charge Coupled Device) camera 63 takes pictures of the soil survey surface L2. The temperature sensor 64 detects temperatures (radiant heat) of the soil survey surface L2.

The front surface (the side facing the soil survey surface) of each of the visible-light sensor 61, infrared-light sensor 62, CCD camera 63, and illuminating optical fibers 65A, 65B is covered with an optical window 66 (quartz glass or the like). On the optical window 66 is blown dry air all the time through an air duct 67. This dry air functions to prevent the optical window 66 from fogging. Ahead of the survey space S1, a first leveling plate 68a and a second leveling plate 68b, which extend from the bottom of the sensing unit 52, level off the soil excavated by the chisel unit, and smooth the uneven surface (facing the sensing unit 52) of the excavated soil that is formed behind the chisel unit 53. As the result, the soil survey surface L2 maintains evenness. FIG. 3B shows a magnified plan view of the installing position of the first leveling plate 68a and the second leveling plate 68b when seen upwardly from the ground surface. As shown in FIG. 3B the first leveling plate 68a is V-shaped and turns the soil aside, while leveling off the ground surface. The second leveling plate 68b is provided with plural comb-teeth-like boards arranged in parallel at its tip. The second leveling plate 68b has the function of further smoothing the ground surface which has been leveled off by the first leveling plate 68a.

There is a soil hardness sensor 100 between the rear end of the chisel unit 53 and the optical sensor housing unit 60. The soil hardness sensor 100 is composed of a piston 101 disposed at the rear of the chisel unit 53, a cylinder 102 disposed at the front of the optical sensor housing unit 60, and a detecting element (load cell) housed inside the cylinder 102. The piston 101 has an oval through-hole 101a along the direction of the diameter. Inserting a screw 102a fixed at the cylinder 102 into the hole 101a restricts the rotation of the piston 101 inside the cylinder 102 and prevents the piston 101 from being fallen out of the cylinder 102. Between a base end unit 101b of the piston 101 and an opening end 102b of the cylinder 102, there is a gap G of 1 mm or so. Specifically, the piston 101 is housed in the cylinder 102 so as to be able to reciprocate within the gap G in the direction of the arrow X. The opening end 102b of the cylinder 102 is provided with a urethane seal ring 102c around its outer surface (around the outer surface of the gap G) to prevent soil from coming into the gap G or the cylinder 102. The load cell 103 includes a distortion gage (not illustrated), which is electrically connected with an electric control device and generates detection signals in accordance with the pressing force of the piston 101. Plural coned disc springs 102d press the load cell 103 from the cylinder 102 towards the piston 101. In the soil hardness sensor 100 with this structure, the piston 101 presses the load cell 103 in accordance with a soil pressure (a parameter related to the soil hardness) that the chisel unit 53 receives from ahead, and the distortion gage in the load cell 103 generates detection signals corresponding to the pressing force, thereby sequentially detecting the soil pressure that the chisel unit 53 receives from the soil ahead. Since the operation of the piston 101 is restricted within the predetermined range, the pressure given to the load cell 103 never exceeds the predetermined values. To be more specific, the load cell 103, which is isolated from outside by the inner wall of the cylinder 102 and the piston 101, can accurately detect the soil pressure that the chisel unit 53 receives from the soil ahead as the amount of distortion against the direction of movement of the chisel unit 53 for a long period of time (with secured sufficient durability).

Figure 4:
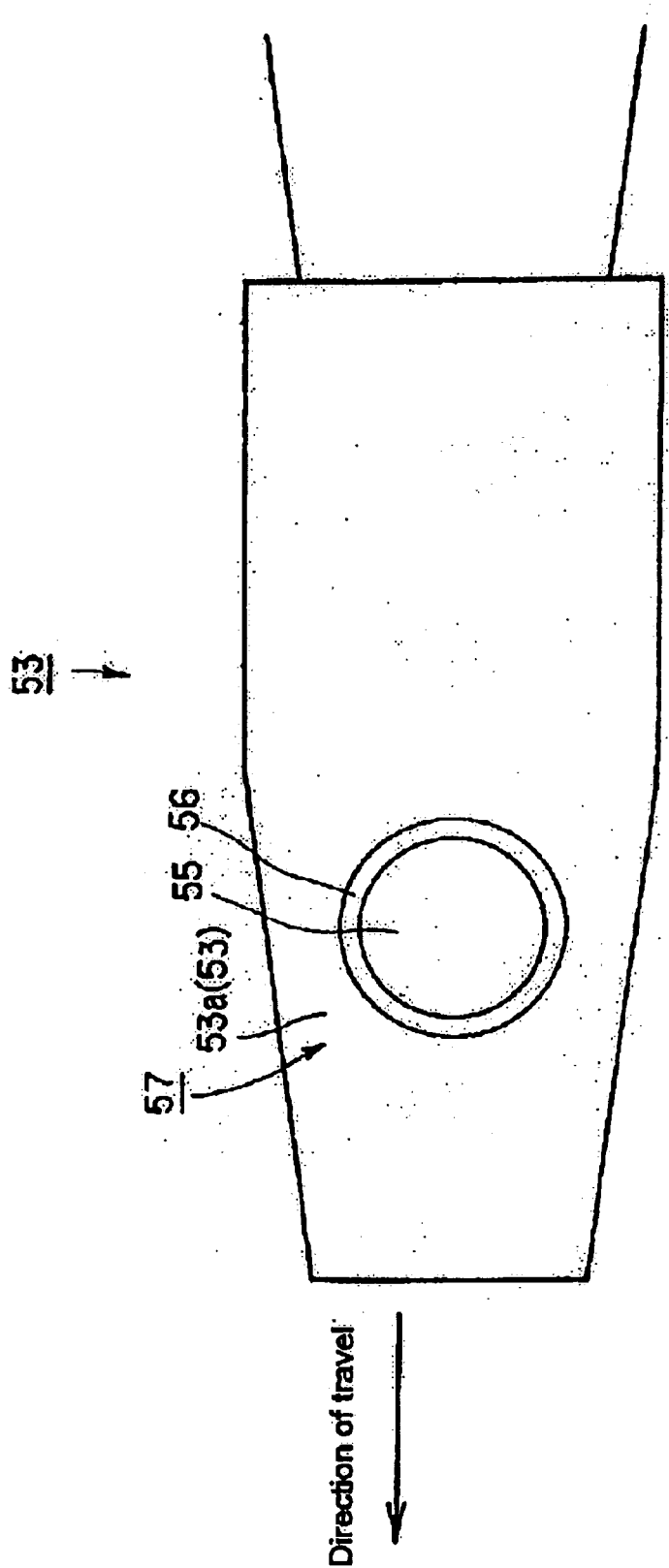
FIG. 4 shows a top view of the external appearance of the chisel unit as a part of the sensing unit in the same embodiment.

FIG. 4 shows a top view of the external appearance of the chisel unit 53. As shown in FIGS. 3A and 4, a surface electrode 55 is buried on the top surface of the chisel unit 53. The surface electrode 55 has an insulating member 56 provided around its outer surface in order to separate the electrode 55 from the chisel unit 53. The surface electrode 55 and the conductive top surface 53a of the chisel unit 53 form a pair of electrodes, thereby structuring an electric characteristic sensor 57, which detects the electric conductivity and dielectric constant of the soil in contact with the top surface 53a of the chisel unit 53 (including the surface electrode 55).

If various conditions including the rate of advancement of the sensing unit 52 in the soil are fixed, the soil pressure that the chisel unit 53 receives from the soil has a strong correlation with the hardness of the soil (soil hardness).

[Electric Structure of the Computer and its Peripherals]

Figure 5:
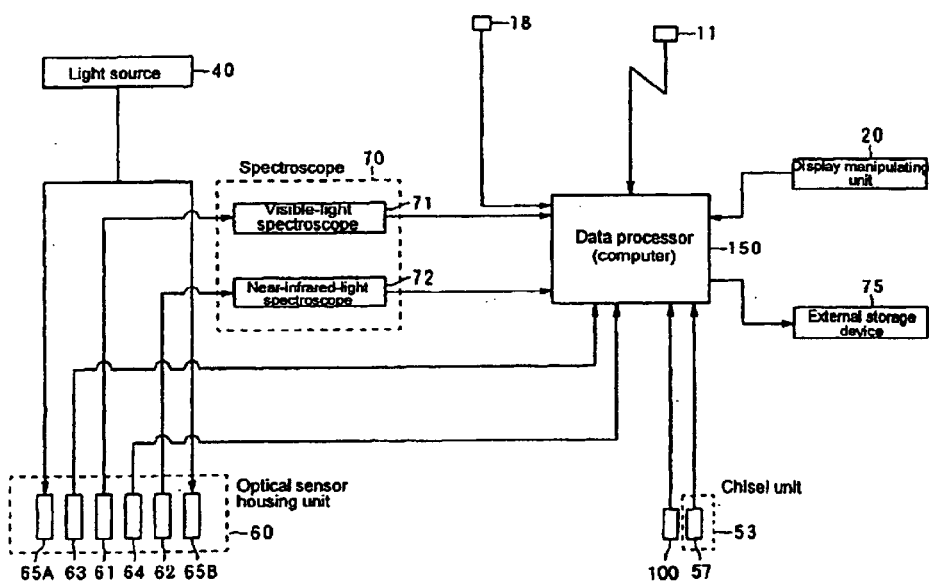
FIG. 5 shows a block diagram illustrating the electric structure of the control unit in the soil characteristics survey device of the same embodiment.

FIG. 5 shows a block diagram of the electric structure of the computer and its peripherals built in the control unit 30.

The computer 150 includes a central processing unit (CPU), a read only memory (ROM), a random access memory (RAM), a backup RAM 34, and a timer counter which are all connected with each other via a bus to construct a logical calculation circuit.

The computer 150 thus structured receives detection signals from the visible-light sensor 61 or the infrared-light sensor 62 installed in the optical sensor housing unit 60 via a spectroscope unit and processes these signals. The spectroscope unit 70 is composed of a visible-light spectroscope 71 and a near-infrared-light spectroscope 72. These spectroscopes 71, 72 are multi-channel spectroscopes provided with a photo diode linear array; the visible-light spectroscope 71 can detect the intensity of light having the wavelengths corresponding to 256 channels in a wavelength range of 400 to 900 nm, whereas the near-infrared-light spectroscope can detect the intensity of light having the wavelengths corresponding to 128 channels in a wavelength range of 900 to 1700 nm at high speed individually. The computer 150 also receives detection signals from the temperature sensor 64 installed in the optical sensor housing unit 60 and picture data from the CCD camera 63, and processes these data information (signals). The computer 150 also receives and processes detection signals transmitted from the electric characteristic sensor 57 and the soil hardness sensor 100 installed in the chisel unit 53. The computer 150 also receives and processes detection signals transmitted from the rotation angle sensor 18 installed in the rotation arm 16. The computer 150 also receives and processes signals transmitted from the GPS satellite 200 via the GPS antenna 11.

The computer 150 processes the signals (data information) received from these units either in accordance with direction signals transmitted from the display manipulating unit 20 or automatically, and displays the processing status and data information on the screen of the display manipulating unit 20. Then the computer 150 stores the results of these processes as recording data information in an external storage device (a card memory or the like) 75 either in accordance with instruction signals sent from the display manipulating unit 20 or automatically.

[Basic Structure of Circuits for Detecting Electric Conductivity and Dielectric Constant]

Figure 6:
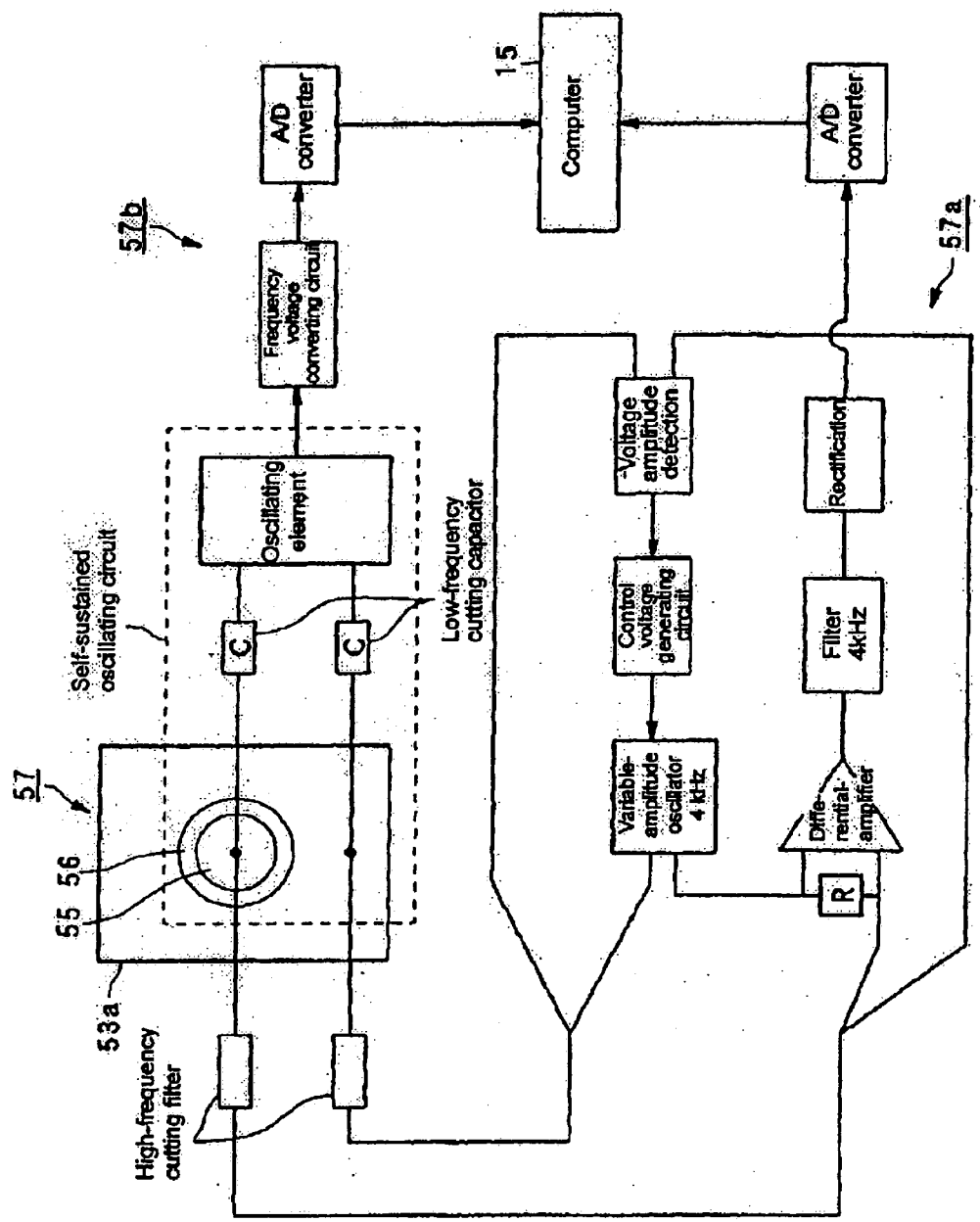
FIG. 6 shows a block diagram illustrating the function of the detection circuit of the same embodiment.

FIG. 6 shows a block diagram indicating the functions of detection circuits which individually output signals in proportion to the electric conductivity and dielectric constant of the soil which gets in contact with the top surface 53a of the chisel unit 53 as detection signals of the electric characteristic sensor 57 to the computer 150.

As shown in FIG. 6 in the electric conductivity detection circuit 57a, the electrodes 55, 53a are applied with an alternating voltage with a frequency of 4 kHz from the transmitting unit of a variable amplitude. While the voltage amplitude of each of the electrodes 55, 53a is detected, a predetermined amplitude control voltage is entered to the oscillator so as to control the output voltage of the oscillator in such a manner that the electrodes 55, 53a are applied with a voltage of the same amplitude. The computer 150 averages the rms values of voltage (in proportion to the electric conductivity of the soil) at both ends of the resistance R for a predetermined period of time and then stores it.

In the case where a direct voltage is used to structure the detection circuits, products of the chemical reaction (electrode reaction) are accumulated on the surfaces of the electrodes, thereby failing to maintain stable measurement for a long period of time. The inventors of the present invention have verified that even when an alternating voltage is adopted, it is preferable to make the voltage amplitude as small as possible to minimize the influence of the electrode reaction.

The inventors of the present invention have also verified that in the case where a constant current is placed between both electrodes, the voltage applied to the electrodes changes depending on the magnitude of the electric conductivity of the soil, which may change the degree of the electrode reaction, making it difficult to measure electric conductivity in a stable manner.

On the other hand, the dielectric constant detection circuit 57b is applied with a high frequency alternating voltage, which is superimposed on the low frequency alternating voltage applied on the electric conductivity detection circuit 57a. In the circuit 57b the electrodes 55, 53a are regarded as the electrode plates of a capacitor, and the dielectric constant of the soil which gets in contact with the electrodes 55, 53a is detected.

Since the electrodes 55, 53a are disposed on the top surface of the chisel unit 53 which is to be the surface to excavate the soil, it gets in contact with the soil all the time, as long as the sensing unit 52 is set into the ground. This achieves an accurate and stable measurement of the electric characteristics of the soil.

The high frequency cutting filter prevents high frequencies from going into the electric conductivity detection circuit 57a, and the low frequency cutting capacitor prevents low frequencies from going into the dielectric constant detection circuit 57b.

In the present embodiment in detecting the electric conductivity of a given soil, an alternating voltage is applied. Instead, it is possible to structure a device for detecting the electric conductivity of a given soil by applying a voltage composed of a waveform pattern in which positive and negative voltages are repeatedly applied, such as a square wave or a triangle wave. It should be noted that it is desirable to use an alternating voltage in the case where the electric conductivity and dielectric constant of a given soil are detected through the same electrodes, that is, in the case where the electric conductivity detection circuit and the dielectric constant detection circuit share the same electrodes.

The same effects as in the aforementioned embodiment can be obtained by adopting a device structure in which a set of electrodes for detecting the electric conductivity of a given soil (a set of electrodes for applying a high frequency alternating voltage) are arranged apart from a set of electrodes for detecting the dielectric constant of the soil (a set of electrodes for applying a low frequency alternating voltage) on the top surface 53a of the chisel unit 53. This is because the device structure having the high frequency electrodes and the low frequency electrodes arranged separately is inferior in mounting performance to the device structure adopted in the aforementioned embodiment (the electric conductivity detection circuit and the dielectric constant detection circuit share the same electrodes), but has superiority in simplifying the detection circuits.

The following is a detailed description about the control logic according to which the soil characteristics survey device 10 acquires the data information about the characteristics of the soil in the agricultural field 3 and the way the device 10 manages the information.

[Basic Routine to Acquire Data Information About Soil Characteristics]

Figure 7:
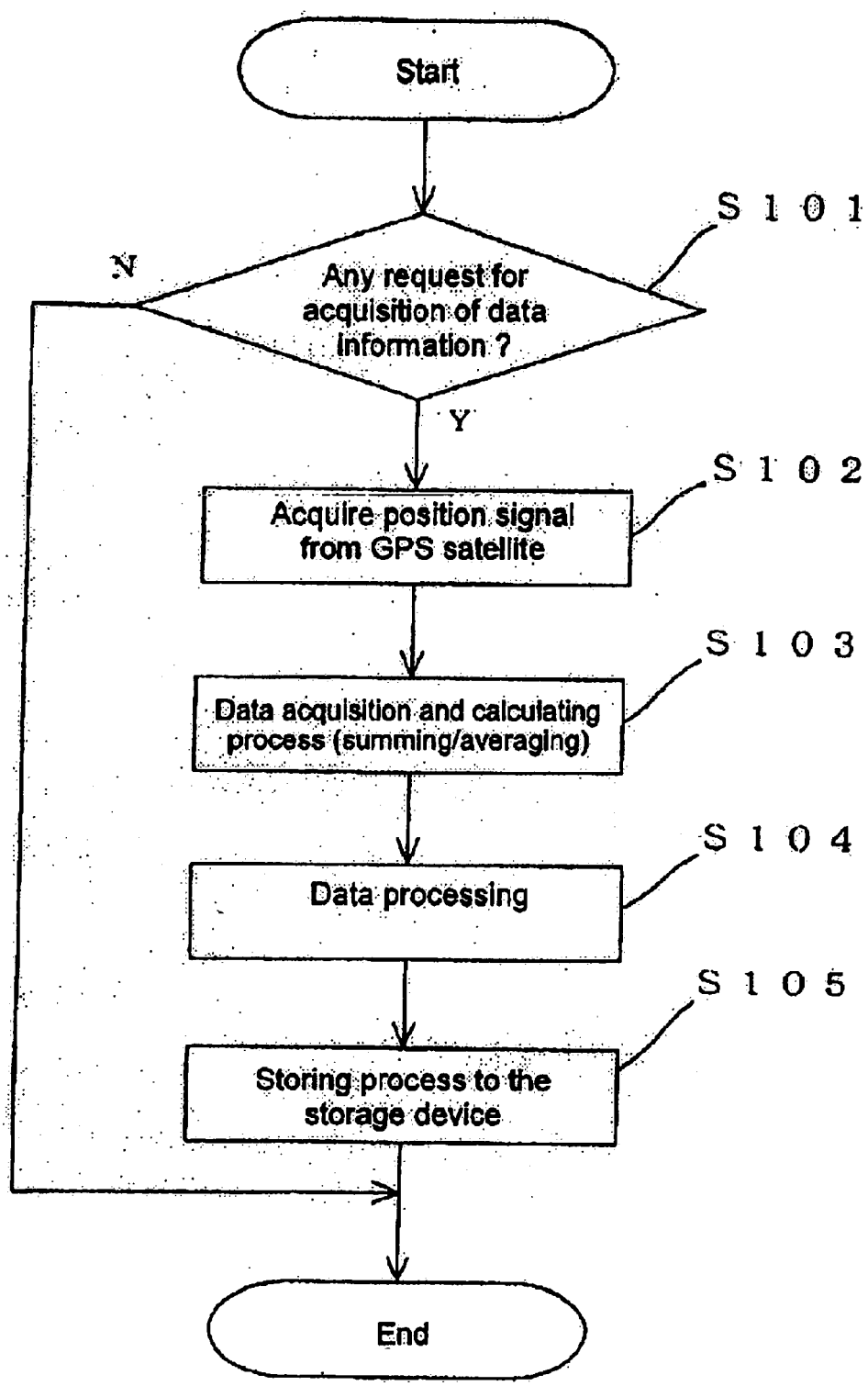
FIG. 7 shows a flowchart depicting the basic routine to record data information about soil characteristics together with the position of data acquisition and the depth of the soil survey surface.

FIG. 7 shows a flowchart which depicts a basic routine for recording data information based on detection signals received from the different sensors disposed in the sensing unit 52, together with the position where the data information has been obtained and the depth of the soil survey surface. This routine is implemented by the computer 150 at predetermined time intervals after the computer 150 is started.

When the process goes into this routine, the computer 150 first determines whether there is a request to acquire data information or not in Step S101. To be more specific, the computer 150 previously stores requirements including the time to acquire data information about the soil and the position of the data information in the agricultural field, and determines whether the current point in time satisfies these requirements or not. When the operator manually enters a predetermined direction signal (the signal to start information acquisition) on a display input manipulating unit, the computer 150 can determine that there is a request to acquire data information. When the determined result is negative in Step S101, the computer 150 goes out from this routine temporarily.

On the other hand, when the determined result is affirmative in Step S101, the computer 150 is informed of the position of the soil characteristics survey device 10 based on a signal transmitted from the GPS satellite 200 (Step S102), then acquires data information based on detection signals from the sensors 61, 62, 63, and 64 contained in the optical sensor housing unit 60 and the sensors 57, 100 contained in the chisel unit 53, thereby calculating (e.g., summing or averaging) the data information (Step S103). The data information subjected to the calculating process is compared with the history of the data information already acquired through the preceding routines and is processed (Step S104).

For example, it is assumed that this routine is implemented at 0.05 second intervals. If the control logic is so structured that data information is acquired for one second after every three-second interval, about 120 pieces of data information are acquired in this one second. The computer 150 applies an averaging process to these 120 pieces (120 sets) of data information and forms the information into one-piece (one set) data information.

Then the computer 150 stores the data information obtained in Step S104 as data information that corresponds to position information transmitted from the GPS satellite 200 and to the depth of the soil survey surface L2 in the external storage device 75 (Step S105), and terminates the process in this routine temporarily.

The soil characteristics survey device 10 of the present embodiment successively acquires and stores data information about characteristics of the soil in each section in the agricultural field 3 basically in accordance with this control logic.

The following is a detailed description of the process in Step S104, that is, the process of the data information obtained through calculating the detection signals of the different sensors out of the process of the basic routine.

[Data Merger Based On Signals of the Sensors]

Figure 8:
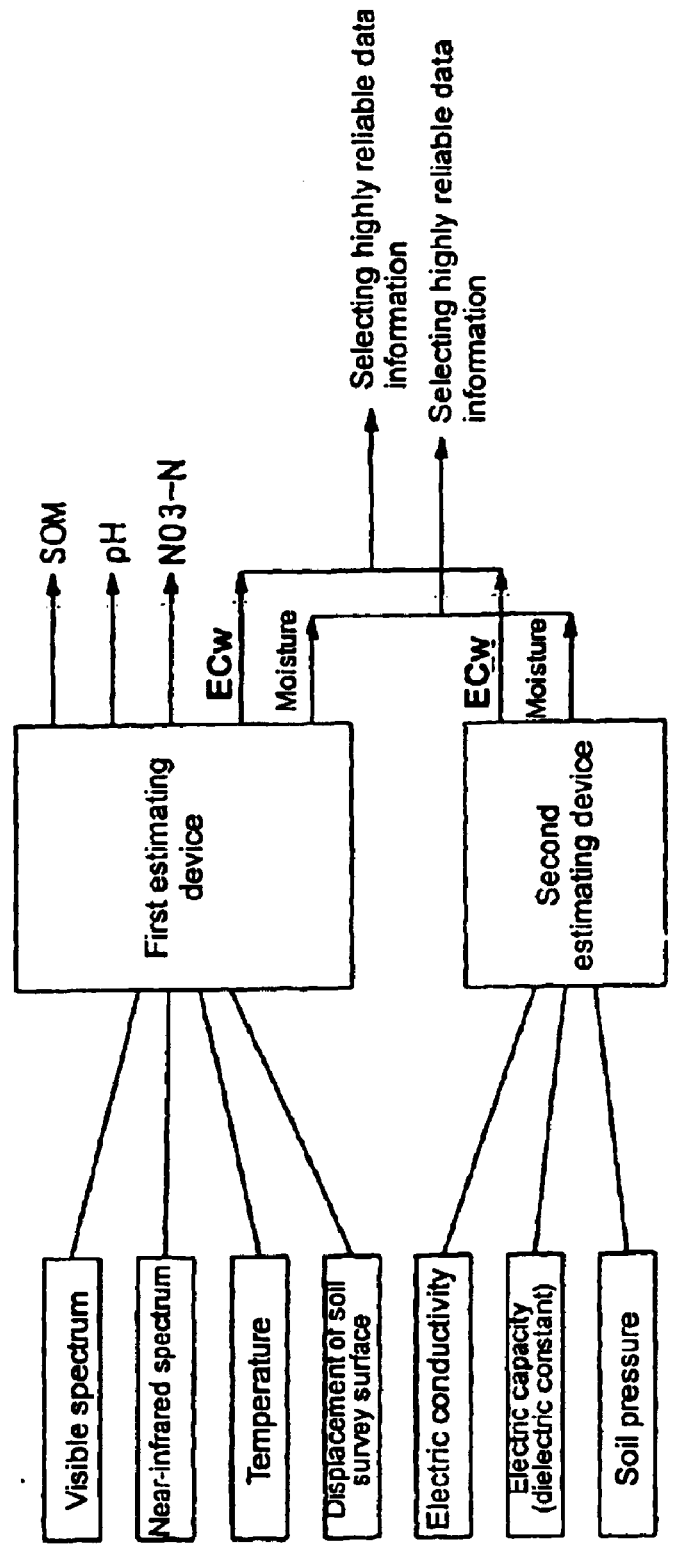
FIG. 8 shows a conceptual diagram illustrating the way to process the output signals of the different sensors provided in the sensing unit of the same embodiment.

FIG. 8 shows a conceptual rough sketch describing how the output signals of the sensors in the sensing unit 52 are processed.

As shown in FIG. 8 the computer 150 has the function of detecting optical characteristics of a given soil, that is, first estimating means for processing the data information obtained through the visible-light sensor 61 and the infrared-light sensor 62, thereby estimating the amount of SOM (Soil Organic Matter), pH, nitrate nitrogen (NO3-N), electric conductivity ECa, the amount of water contained (water content), and the like.

The computer 150 also has the function of detecting electric or dynamic characteristics of the soil, that is, second estimating means for processing the data information obtained through the electric characteristic sensor 57 and the soil hardness sensor 100, thereby estimating the electric conductivity ECa, the amount of water contained (water content), and the like.

The electric conductivity ECa and the amount of water (water content) of a given soil can be known either through a detecting device for detecting the optical characteristics of the soil or a detecting device for detecting the electric or dynamic characteristics of the soil. In the soil characteristics survey device 10 of the present embodiment, a merging process of data information is performed in such a manner that the data information about the survey items (e.g., electric conductivity ECa or water content) commonly obtained through the different detecting devices are compared with each other and the most reliable data information is adopted.

[Merging Process for Information About Optical Spectra and Electric Conductivity of Soil]

Figure 9:
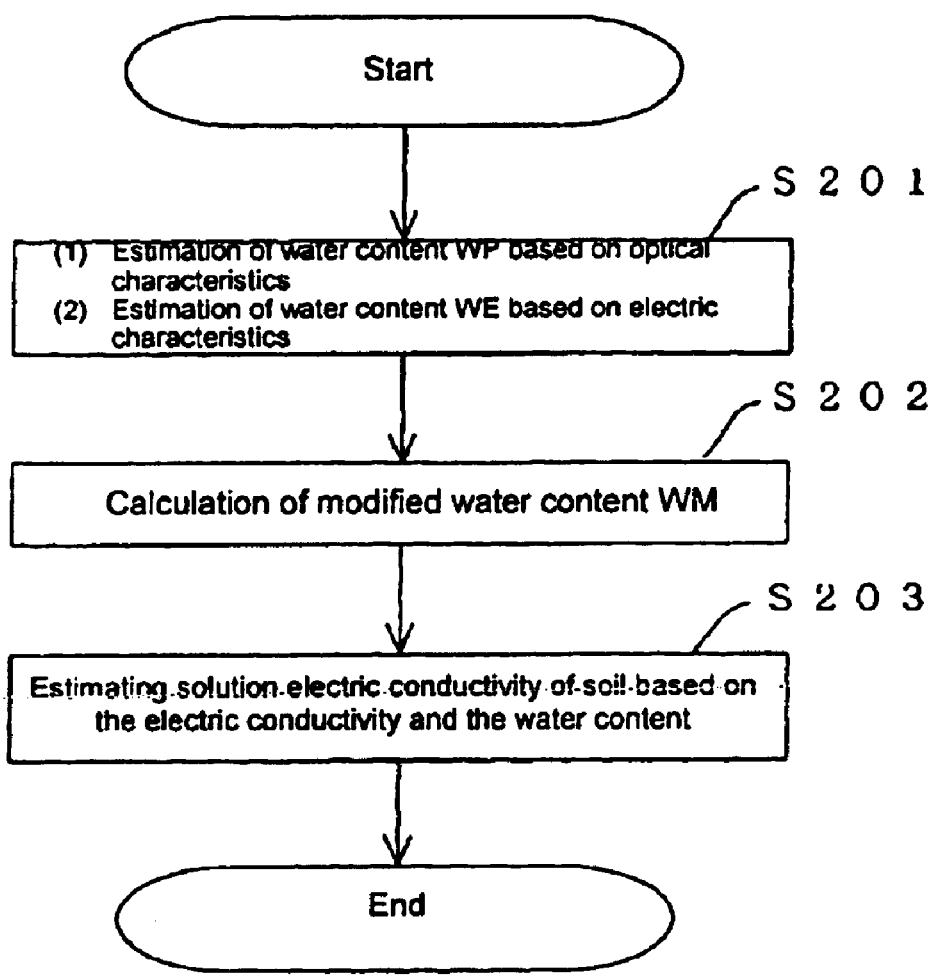
FIG. 9 shows a flowchart depicting the process routine of merging the information about optical spectra and electric conductivity of a given soil in the same embodiment.

FIG. 9 shows a flowchart which depicts a specific routine for a merging process of information about the optical spectra and electric conductivity of a given soil, out of the processes for the data information about soil characteristics. The process routine in this flowchart is included in, e.g., Step S104 in the previous basic routine (FIG. 7) as a part of the process implemented by the computer 150 of the soil characteristics survey device 10.

When the process goes into this routine, the computer 150 first selects the latest obtained data information about the soil at any given survey points in the agricultural field 3 as data information used for the merging process at Step S201. While estimating the water content in the soil at the respective survey points based on the detection signals of the visible-light sensor 61 and the infrared-light sensor 62 installed in the optical sensor housing unit 60, the computer 150 estimates the water content in the soil in the respective survey points based on the detection signals of the electric characteristic sensor 57 (dielectric constant detection circuit 57*b*).

In Step S202 the water content (hereinafter referred to as the water content based on optical characteristics) WP estimated based on the detection signals of the visible-light sensor 61 and the infrared-light sensor 62 is compared with the water content (hereinafter referred to as the water content based on electric characteristics) WE of the soil in the respective survey points based on the detection signals of the electric characteristic sensor 57, thereby calculating the water content (hereinafter referred to as the applied water content) WM with higher reliability as the water content in the soil in the respective survey points.

The following is a description of a method for calculating the applied water content WM.

If the deviation between the water content WP based on the optical characteristics and the water content WE based on the electric characteristics are within the predetermined range, then the average between these values WP, WE is used as the applied water content WM. On the other hand, when the deviation exceeds the predetermined values, then the data information obtained in the survey point that is geographically closest to this survey point is adopted to calculate the applied water content WM.

In Step S203, the solution electric conductivity ECw of the soil is estimated based on the electric conductivity ECa and the applied water content WM obtained in Step S202. The electric conductivity ECa is calculated based on the detection signals of the electric characteristic sensor 57 (electric conductivity detection circuit 57*a*).

After Step S203, the computer 150 terminates the process in this routine for a time only.

After the completion of the process in this routine, the computer 150 returns the process to, e.g., Step S105 shown in FIG. 7, thereby storing the applied water content WM and solution electric conductivity ECw of the soil obtained this time in the external storage device 75 as data information to form a map showing the distribution of these parameters WM and ECw across the agricultural field 3.

Figure 10:
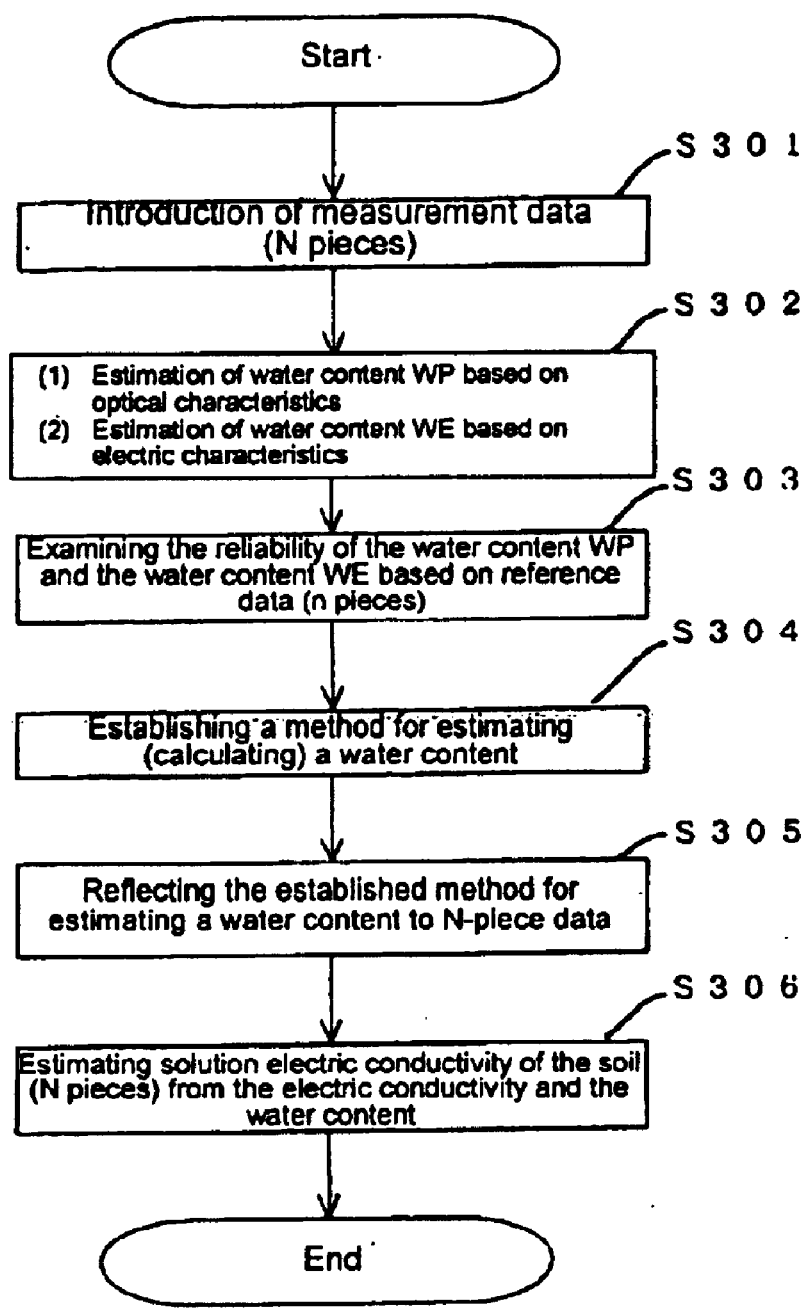
FIG. 10 shows a flowchart depicting a process routine for merging the information about optical spectra and electric conductivity of a given soil in the same embodiment.

After the completion of the survey in the agricultural field 3, the process routine (FIG. 9) maybe replaced by a process in accordance with, e.g., the process routine shown in FIG. 10 independent of the basic routine (FIG. 7).

The following is a description about the process routine shown in FIG. 10. This routine can be implemented through the computer 150 or through another control device based on the data information stored in the external storage device 75. Prior to the implementation of this routine, out of N survey points inside the agricultural field 3, soil samples are actually taken from n (n<N) survey points, and the electric conductivity and water content of these soil samples are measured using analyzing apparatuses in an experiment room in advance and then stored in the external storage device 75 or the like as standard data information.

In this routine the computer 150 selects data information obtained in at N points in the agricultural field 3 as the data information used for a merging process in Step S301.

In Step S302 the water content of the soil in each survey point is estimated based on the detection signals of the visible-light sensor 61 and infrared-light sensor 62 installed in the optical sensor housing unit 60, and is also estimated based on the detection signals of the electric characteristic sensor 57 (dielectric constant detection circuit 57b).

In Step S303, it is determined which of the water content (hereinafter referred to as the water content based on optical characteristics) WP estimated based on the detection signals of the visible-light sensor 61 and the infrared-light sensor 62 and the water content (hereinafter referred to as the water content based on electric characteristics) WE of the soil in the respective survey points based on the detection signals of the electric characteristic sensor 57 shows the stronger correlation, with regard to the data groups obtained from the same position that the soil samples are taken to acquire the standard data information, out of the N data groups used for the merging process. Of the water content WP based on optical characteristics and the water content WE based on electric characteristics, the data information that shows the stronger correlation with the water content (hereinafter referred to as the standard water content) WS as the standard (reference) data information is adopted as the water content (applied water content) of the soil in the agricultural field.

In Step S304, a method for calculating an accurate water content from the adopted water content (WP or WE) which is adopted in Step S303 is established by comparing the adopted water content and the standard water content in regard to n pieces of data information (for example, a regression formula showing the relation between these water contents can be adopted as a formula for computation).

In Step S305, in regard to the N-piece data information this time selected in Step S301, the adopted water content (WP or WE) obtained in the same manner as the method for estimating a water content established in Step S303 is adopted as the water content (applied water content) WM of the soil in the respective survey points.

In Step S306 the solution electric conductivity ECw of the soil is estimated based on the electric conductivity ECa and the applied water content WM. The electric conductivity ECa is calculated based on the detection signals of the electric characteristic sensor 57 (the electric conductivity detection circuit 57a).

After Step S306 the computer 150 terminates the process in this routine temporarily.

Similar to the aforementioned process routine (FIG. 9), after the completion of the process in this routine, the computer 150 returns the process to, e.g., Step S105 shown in FIG. 7, thereby storing the applied water content WM and solution electric conductivity ECw of the soil obtained this time in the external storage device 75 as data information to form a map showing the distribution of these parameters WM and ECw across the agricultural field 3.

Besides the solution electric conductivity of the soil, other parameters contained in the soil such as an organic content or a specific mineral content can be estimated from the electric and optical characteristics of the soil separately by adopting the same control system as the routine (FIG. 9 or 10). Comparing these estimated results can bring about the same or equivalent effects as in the present embodiment that highly reliable data information can be acquired in regard to the distribution of a specific characteristic of the soil in the agricultural field.

As described herein before, according to the soil characteristics survey device 10 of the present embodiment, while the device 10 is towed by the tractor 2, the soil excavating unit 50 effectively excavates the soil, thereby forming the survey space S1 (soil survey surface L2) behind it. The chisel unit 53 disposed in the forward part of the soil excavating unit 50 has the function of, from the excavated soil surface, directly detecting electric characteristics of the soil (e.g., electric conductivity or dielectric constant) through the electric characteristic sensor 57 disposed in the tip of the chisel unit 53, and also efficiently detecting dynamic characteristics of the soil (e.g., soil pressure or soil hardness) through the soil hardness sensor 100 disposed behind the tip of the chisel unit 53 by a predetermined length.

On the other hand, the sensing unit 52 disposed in the rear of the soil excavating unit 50 has the function of detecting optical characteristics of the soil (e.g., near-infrared-light spectra, visible-light spectra, photo images) or thermodynamic characteristics of the soil (e.g., temperatures of the soil surface). Such a structure enables this soil characteristics survey device to survey various characteristics about nearly the same soil samples almost simultaneously and successively. Since the various characteristics of the same soil examples are managed together with the information from the GPS satellite, the accurate distribution of these soil characteristics in the agricultural field can be acquired efficiently and used to form a map or the like.

In the soil characteristics survey device 10 of the present embodiment, a single (same) parameter about soil characteristics (e.g., solution electric conductivity or organic material content of the soil) is estimated individually based on the soil characteristics (e.g., water content WP) acquired by the chisel unit (first detecting means) 53 and the soil characteristics (e.g., water content WE) acquired by the sensing unit (second detecting means) 52. Therefore, comparing the individual parameters with each other can provide more reliable data information about a single parameter about the soil characteristics. In the present embodiment the electric characteristic sensor 57 detects electric conductivity or dielectric constant of a given soil by placing a voltage between a pair of electrodes which get in contact with the soil as an object to be detected. Instead, other electric characteristics including electric capacity of the soil may be detected based on the same principle.

Second Embodiment

The following is a description about a second embodiment as an example of the soil characteristics survey device of the present invention, particularly the main points of difference between the first and the second embodiment.

The soil characteristics survey device of the second embodiment has approximately the same hardware structure as the device of the first embodiment. For this reason, the components of the second embodiment having the same structure or function as those in the first embodiment are referred to with the same names or reference symbols, and their description will not be repeated here.

The soil characteristics survey device of the present embodiment uses basically the same control logic (refer to FIGS. 7, 9, and 10) as used in the device of the first embodiment in regard to the merging process of various data information about soil characteristics.

The soil characteristics survey device of the present embodiment differs from the device of the first embodiment in that the sensing unit (optical sensor housing unit) includes a soil displacement sensor which measures the distance between the different sensors and the soil survey surface, and this distance is reflected on the generation of data information about soil characteristics.

[Structure of Sensing Unit]

Figure 11:
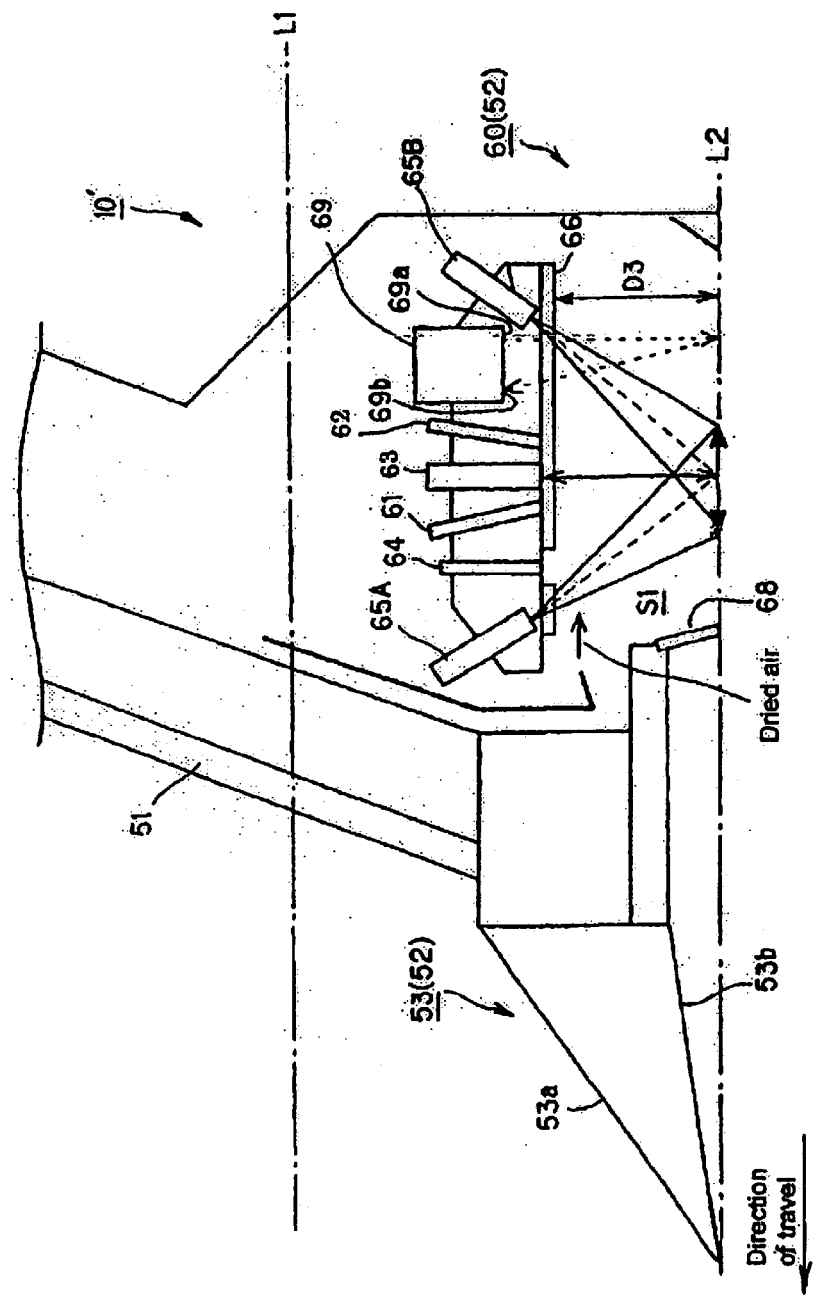
FIG. 11 shows a diagrammatic cross sectional side view of the internal structure of the sensing unit of the soil characteristics survey device of the second embodiment of the present invention.

FIG. 11 shows a diagrammatic cross sectional side view of the internal structure of the sensing unit in the soil characteristics survey device of the present embodiment.

In FIG. 11 the optical sensor housing unit 60 of the soil characteristics survey device 10' includes a soil displacement sensor (laser range finder) 69 disposed between the infrared-light sensor 62 and the illuminating optical fiber 65B. The soil displacement sensor 69 includes a laser light radiation unit 69a which radiates laser light of a specific wavelength (e.g., 780 nm) to the target to be measured (soil survey surface L2) and a light reception unit 69b which detects light reflected from the soil survey surface L2, and has the function of measuring the distance D3 between the laser light radiation unit 69a and the soil survey surface L2 using the principle of triangulation techniques. Like the other sensor materials 61 to 64 contained in the optical sensor housing unit 60, the soil displacement sensor 69 is electrically connected to the computer 150 inside the control unit (refer to FIG. 5), and successively outputs minute fluctuations in the distance D3, that is, signals in accordance with changes in the soil survey surface L2 to the computer 150. The computer 150 converts unevenness of the soil survey surface L2 into indicators based on output signals of the soil displacement sensor 69, and determines the reliability of the data information corresponding to the survey point from which the signals are obtained.

In the present embodiment the laser range finder 69 is adopted as the soil displacement sensor; however, it can be replaced by other range finders having the function of measuring the distance from the object, such as a range finder with an LED as the light source or an ultrasonic range finder.

[Electric Structure of Signal Processing Unit of Soil Displacement Sensor]

Figure 12:
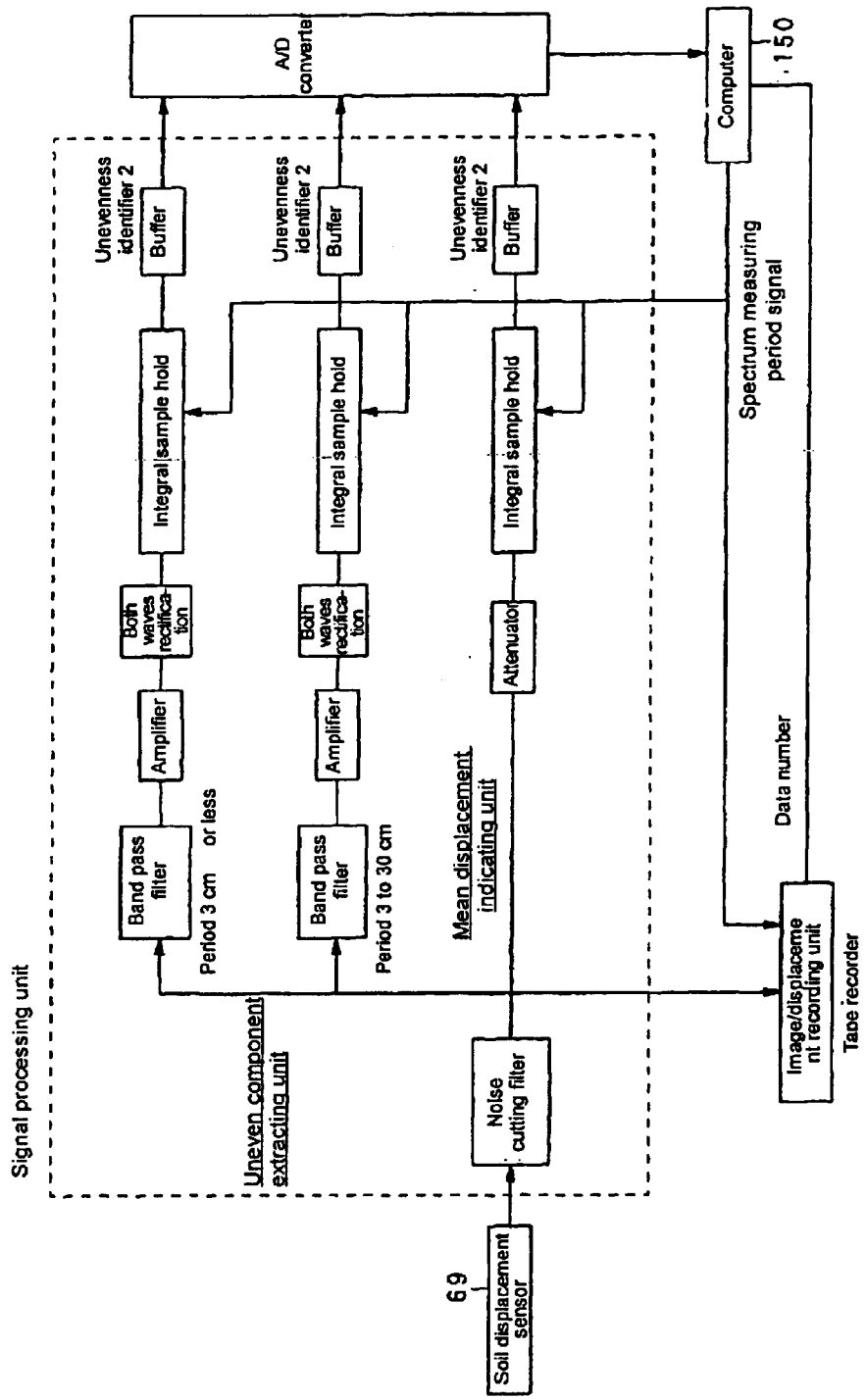
FIG. 12 shows a block diagram illustrating the function of the signal processing unit which converts output signals of the soil displacement sensor into indicators in the same embodiment.

FIG. 12 shows a block diagram of the electric structure and function of the signal processing unit which converts output signals of the soil displacement sensor 69 into indicators and transmits them to the computer 150.

As shown in FIG. 12 after their high-frequency components (noise) are removed through a noise cutting filter, the output signals of the soil displacement sensor 69 are converted into numbers as three different indicators (mean distance, unevenness indicator 1, and unevenness indicator 2) and transmitted to the computer 150.

The mean distance mentioned above corresponds to the mean value (mean distance) of the distance D3 detected during a survey period (e.g., one second). In order to generate a signal corresponding to the mean distance, output signals (noise-free) of the soil displacement sensor 69 is integrated and subjected to an A/D conversion during the survey period.

The unevenness indicator 1 indicates the number (the number detected on the soil survey surface which becomes the target to be measured) of unevenness (comparatively a large degree of unevenness) corresponding to the output signals whose frequency components are 1 to 10 Hz of the soil displacement sensor 69. In order to generate signals corresponding to the unevenness indicator 1, of the output signals (noise-free) of the soil displacement sensor 69, those having frequency components of 1 to 10 Hz are taken out, rectified, integrated, and subjected to an A/D conversion.

The unevenness indicator 2 indicates the number (the number detected on the soil survey surface which becomes the target to be measured) of unevenness (comparatively a small degree of unevenness) corresponding to the output signals whose frequency components are 10 Hz or larger of the soil displacement sensor 69. In order to generate signals corresponding to the unevenness indicator 2, of the output signals (noise-free) of the soil displacement sensor 69, those having frequency components of 10 Hz or larger are taken out, rectified, integrated, and subjected to an A/D conversion.

Instead of the above-mentioned way where the A/D conversion is performed after a series of processes including noise removal, takeout of specific frequency components, rectification, and integration, it is possible to adopt the way where the output of the soil displacement sensor 69 is directly subjected to an A/D conversion, and then calculated by the computer 150 so as to find each indicator.

[Choice of Indicator and Selection of Data Information About Displacement of Soil]

Figure 13:
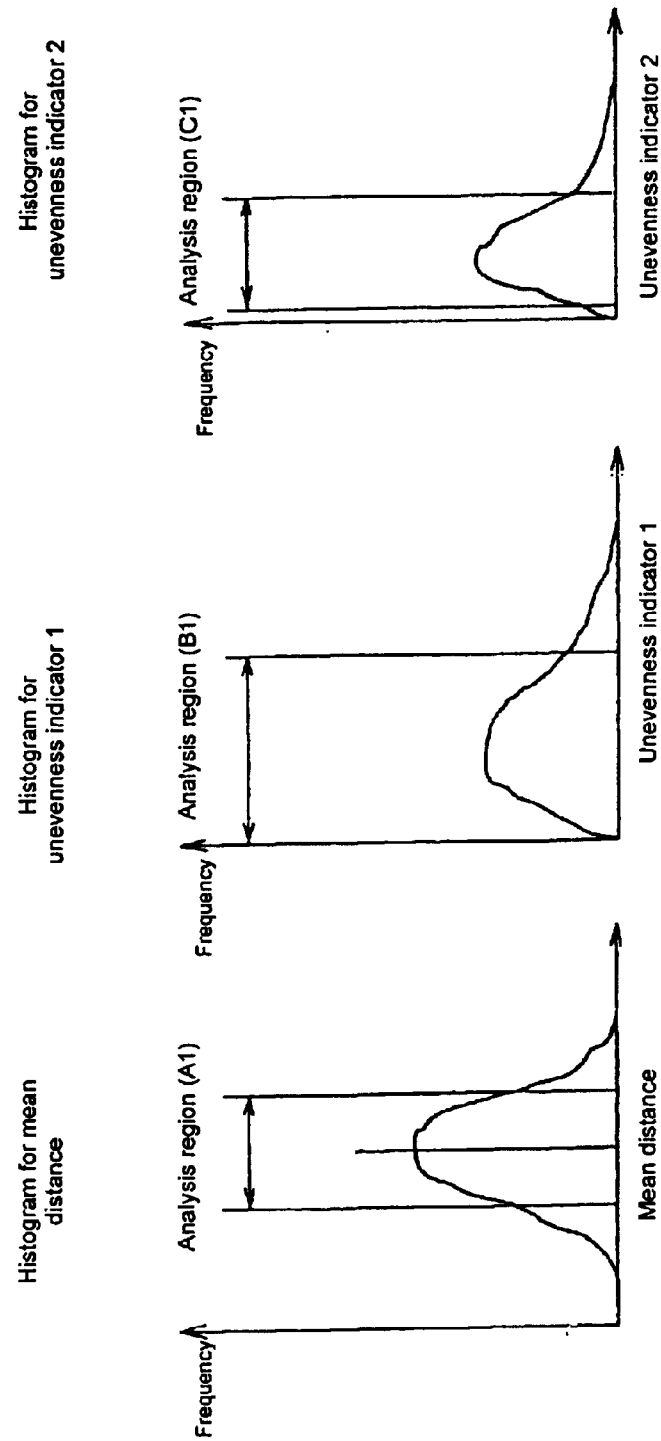
FIGS. 13A, 13B and 13C show histograms for three different indicators about soil displacement obtained in plural survey points in the same embodiment.

FIGS. 13A, 13B and 13C show examples of histograms for the mean distance, the unevenness indicator 1, and the unevenness indicator 2 obtained in plural survey points.

In the soil characteristics survey device 10' of the present embodiment, the predetermined analysis region is set on the horizontal axis (the size of the indicator) of each histogram, and the mean distance, the unevenness indicator 1, and the unevenness indicator 2 select only data information (data information obtained through the visible-light sensor 61 or the infrared-light sensor 62) obtained in survey points inside the analysis region on each histogram as data information to conduct detailed analysis (optical spectrum analysis) about soil characteristics (optical characteristics), and store the selected data information in the external storage device 75.

The analysis region (A1) on the histogram for the mean distance can be set in the predetermined range having the mean value of all data (mean distances) in the center of the range. The analysis region (B1) on the histogram for the unevenness indicator 1 can be set in the predetermined range having its minimum value at "0". The analysis region (C1) on the histogram for the unevenness indicator 2 is preferably set in the predetermined range having its minimum value as somewhat larger than "0". This is because when the unevenness indicator 2 is "0", the soil survey surface L2 is in the condition close to a specular surface without even minute unevenness, and this condition does not allow the light reflected on the soil survey surface L2 to be diffused, which is unsuitable for optical spectrum analysis.

Figure 14:
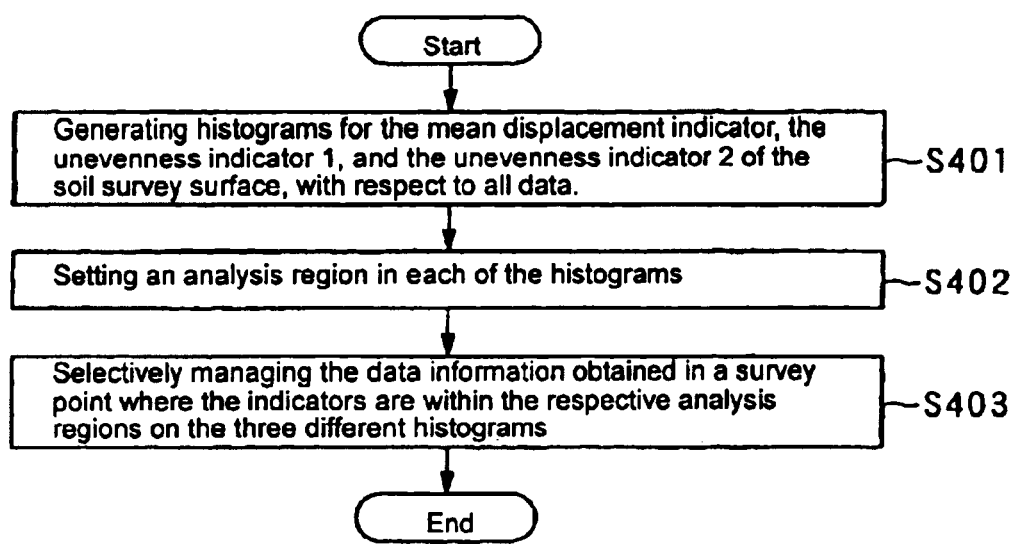
FIG. 14 shows a flowchart depicting a process routine for selecting the data information used of an optical spectrum analysis based on the three different indicators of the soil displacement obtained in each survey point in the same embodiment.

FIG. 14 shows a flowchart depicting the process routine for selecting data information to be used for the optical spectrum analysis, based on the three different indicators (mean distance, unevenness indicator 1, unevenness indicator 2) of soil displacement in each survey point.

This routine is implemented by the computer 150 after the soil characteristics have been surveyed in the predetermined number of survey points.

When the process goes into this routine, in Step S401 the computer 150 introduces the mean distance, the unevenness indicator 1, and the unevenness indicator 2 of the soil survey surface and generates their histograms about all data information to be processed (e.g. data information obtained in all the survey points in which a survey has been conducted so far).

As described with reference to FIGS. 13A, 13B and 13C an analysis region is set in each histogram (Step S402), and the data information (related to optical characteristics of the soil) that has been obtained in a survey point where all of the mean distance, the unevenness indicator 1, and the unevenness indicator 2 of the soil survey surface are within the respective analysis regions in the histograms is exclusively regarded as being highly reliable, and stored in the external storage device 75 (Step S403) and used for detailed analysis.

[Other Processes of Selecting Indicators for Soil Displacement]

In the second embodiment, histograms are generated for three different indicators: mean distance, unevenness indicator 1 and unevenness indicator 2, and the reliability of the data information obtained in each survey point (data information obtained through the visible-light sensor 61, the infrared-light sensor 62, and the like) is determined by whether or not each indicator is within the predetermined analysis region on the histogram.

It is also possible to generate histograms for other indicators and to determine the reliability of the data information (data information obtained through the visible-light sensor 61, the infrared-light sensor 62, and the like) obtained in each survey point based on these histograms.

The following is a description of another process form applicable to the soil characteristics survey device 10'. This process form introduces new concepts: mean displacement "m", displacement variance "v", and asymmetry "s" as three different indicators about soil displacement, which are data information obtained in individual time periods in the respective survey points. These indicators can be obtained by analyzing time-line signals about soil displacement recorded in e.g., the data recorder shown in FIG. 12.

The differential between the optimum value of the distance D3 and the actual distance D3 is defined as the displacement "d". The mean displacement "m" indicates a mean value of the displacements obtained during the survey period in the respective survey points. The displacement variance "v" indicates variance of the displacements obtained during the survey period in the respective survey points. The asymmetry "s" is expressed as the function in proportion to the third power of the difference between the mean displacement "m" and the displacement "d", that is "$\alpha \cdot (m-d)^3$ wherein $\alpha$ is a constant".

Figure 15A:
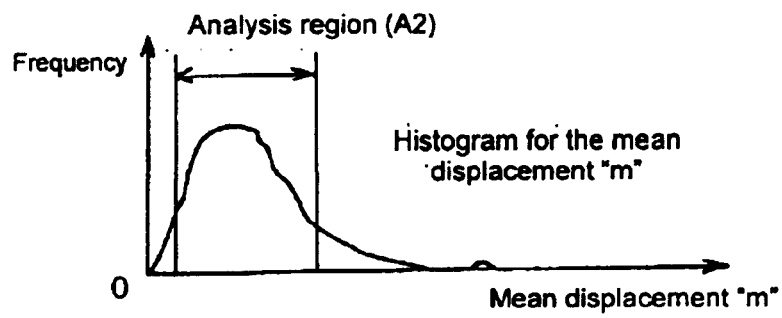
FIGS. 15A, 15B and 15C show histograms generated from mean displacement, displacement variance, and asymmetry obtained in plural survey points in the same embodiment.
Figure 15B:
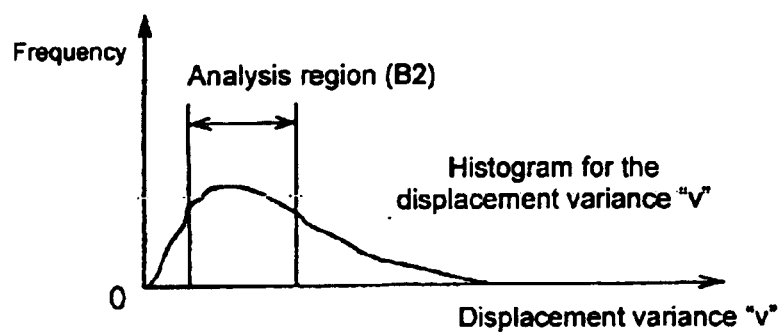
Figure 15C:
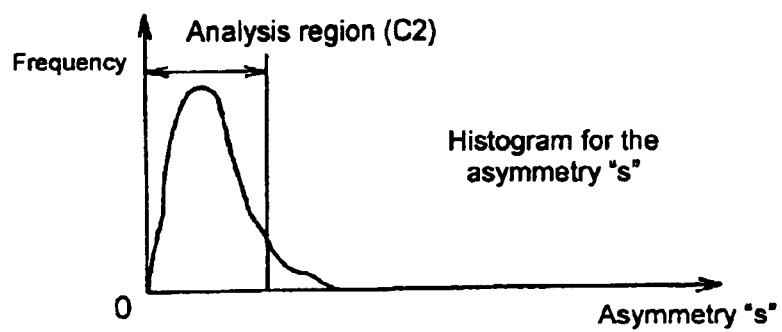

FIGS. 15A, 15B and 15C show examples of histograms generated from the mean displacement "m", the displacement variance "v", and a symmetry "s" obtained in plural survey points.

The analysis region (A2) on the histogram for the mean displacement is set in the predetermined range having the mean value of all data at the center of the range. The analysis region (B2) on the histogram for the displacement variance "v" is preferably set in the predetermined range having its minimum value as somewhat larger than "0". This is because when the displacement variance "v" is "0", the soil survey surface L2 is in the condition close to a specular surface without even minute unevenness, and this condition does not allow the light reflected on the soil survey surface L2 to be diffused, which is unsuitable for optical spectrum analysis. The analysis region (C2) on the histogram for the asymmetry "s" is set in the predetermined range having the optimum value (minimum value) as "0".

As described above, in the case where the mean displacement "m", the displacement variance "v", and asymmetry "s" are adopted as the indicators for soil displacement, according to the same control logic as the process routine shown in FIG. 14, the data information (related to optical characteristics of the soil) that has been obtained in a survey point where all of the indicators m, v, and s are within the respective analysis regions on the histograms is exclusively regarded as being highly reliable, and stored in the external storage device 75 and used for detailed analysis.

As described herein before, in the soil characteristics survey device 10' of the present embodiment it becomes possible to acquire highly reliable data information about optical or thermodynamic characteristics of a given soil stably and successively, regardless of fluctuations in the conditions of unevenness of the soil survey surface.

Third Embodiment

The following is a description about a third embodiment as an example of the soil characteristics survey device of the present invention, particularly the main points of difference between the second and the third embodiment.

The soil characteristics survey device of the third embodiment has approximately the same hardware structure as the device of the second embodiment. To be more specific, the soil characteristics survey device of the third embodiment also has a soil displacement sensor in the optical sensor housing unit in order to measure the distance between the different sensors installed in the optical sensor housing unit and the soil survey surface. Also, the soil characteristics survey device of the third embodiment uses basically the same control logic (refer to FIGS. 7, 9, 10, etc.) as used in the devices of the first and second embodiments in regard to the merging process of various data information about soil characteristics.

It should be noted that the soil characteristics survey device of the third embodiment differs from the devices of the first and second embodiments in that the device can feedback control the angle of approach of the sensing unit (chisel blade) against the soil, based on output signals of the soil displacement sensor.

Figure 16:
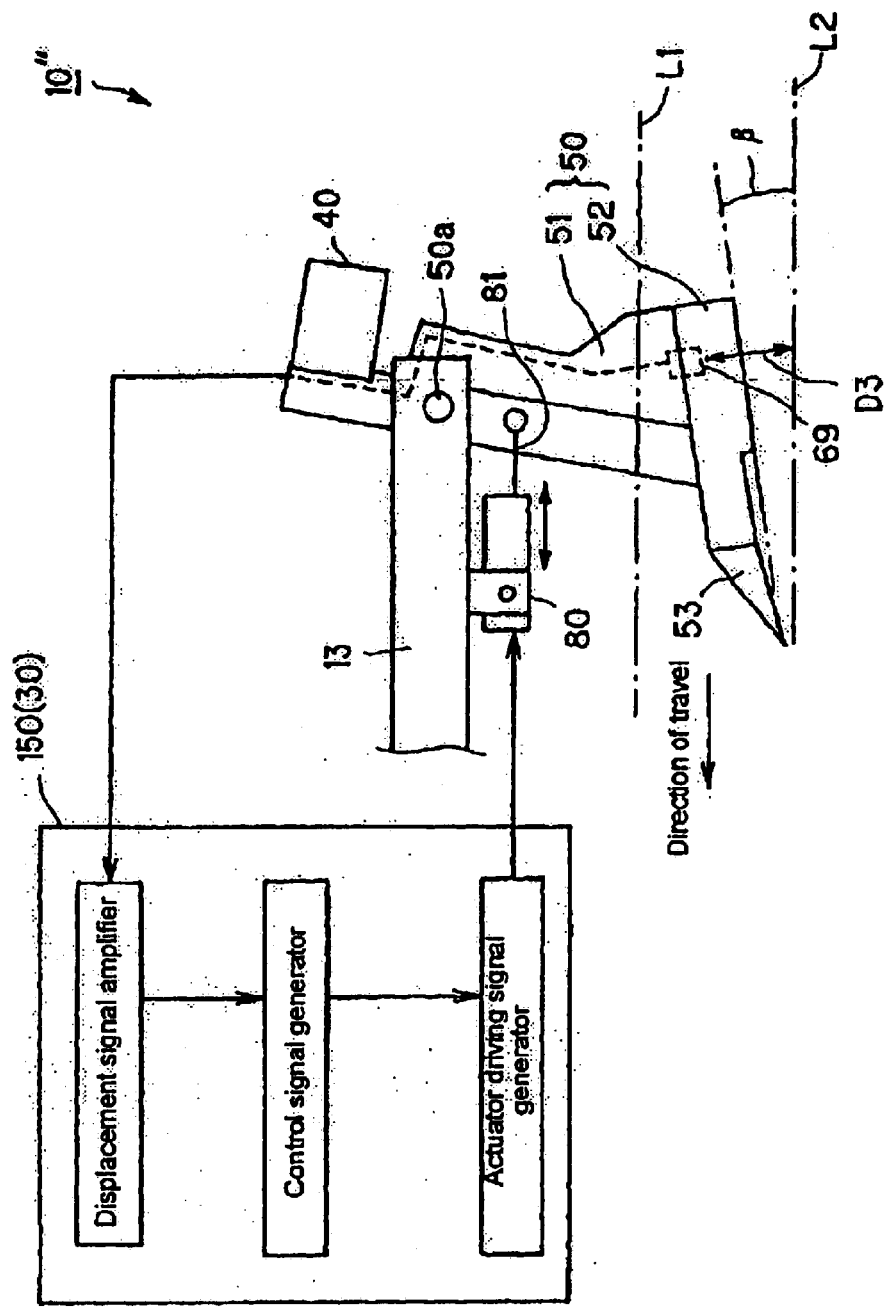
FIG. 16 shows a schematic diagram of the soil excavating unit and its peripherals together with the computer in the third embodiment of the present invention.

FIG. 16 schematically shows the soil excavating unit and its peripheral portion together with the computer as a part of the soil characteristics survey device of the present embodiment.

As shown in FIG. 16 the soil characteristics survey device of the present embodiment is provided with a driving device 80 attached on the bottom surface of the pedestal 13. The driving device 80 operates in accordance with directive signals transmitted from the computer 150 and allows a bar 81 supported by the shank 51 at one end to move back and forth so as to control movement of the soil excavating unit 50 attached to the pedestal 13 to turn around an axis 50$a$, thereby adjusting the angle $\beta$ of the sensing unit 52 (chisel blade 53) against the soil. The computer 150 operates the driving device 80 based on output signals of the soil displacement sensor (laser range finder) 69 disposed in the optical sensor housing unit 60, and performs a feedback control in such a manner that the distance D3 between the light reception unit of the sensor 69 and the soil survey surface L2 (the distance between the sensors 61, 62 and others for detecting optical characteristics of the soil and the soil survey surface L2) is kept at the optimum values.

As described herein before, also in the soil characteristics survey device 10" of the present embodiment, it becomes possible to acquire highly reliable data information about optical or thermodynamic characteristics of a given soil stably and successively, regardless of fluctuations in the conditions of unevenness of the soil survey surface.

In the device form shown in FIG. 16 the distance D3 can be optimized by adjusting the angle β of the sensing unit 52. The distance D3 can be also optimized by adopting a driving device capable of variably controlling the distance between the pedestal 13 and the ground surface L1.

The driving device 80 can be hydrostatic driven, motor driven, or other types.

Fourth Embodiment

The following is a description about a fourth embodiment as an example of the soil characteristics survey device of the present invention, particularly the main points of difference between the first-third embodiments and the fourth embodiment.

The soil characteristics survey device of the fourth embodiment has approximately the same hardware structure as the device of each of the aforementioned embodiments. Also, the soil characteristics survey device of the fourth embodiment uses basically the same control logic (refer to FIGS. 7, 9, 10, etc.) as used in the device of each of the aforementioned embodiments in regard to the merging process of various data information about soil characteristics.

The soil characteristics survey device of each embodiment of the present invention, including the fourth embodiment, is provided with plural sensors arranged differently along the soil survey surface in order to obtain data information about soil characteristics, and these sensors individually output detection signals about various soil characteristics.

The detection signals output individually by the different sensors at any given points in time do not actually correspond to the same portion on the soil survey surface.

It is assumed that the distance between the electric characteristic sensor and the infrared-light sensor on the soil survey surface L2 is 60 cm and that the sensing unit advances at a constant rate of 30 cm/sec. In this case, the soil survey surface corresponding to the detection signals output from the infrared-light sensor at any given point in time to fall on the soil survey surface corresponding to the detection signals output two seconds earlier (60 cm÷30 cm/sec) by the electric characteristic sensor.

In the soil characteristics survey device of the present embodiment, the difference in the time at which the different data information is acquired from the same soil sample is calculated based on the positional relationship of the different sensors installed in the device (to be more specific, the positional relationship of the soils to be detected by the different sensors) and the rate of advancement of the sensing unit, thereby grouping the data information in a manner that the different locations of information about the same soil sample (the data information about soil characteristics) are managed collectively. In other words, the characteristics of the soil on the soil survey surface and the characteristics of the soil in contact with the electrodes of the top surface 53a of the chisel unit 53 can be detected from nearly the same soil example and managed as a set of data.

The following is a description about a specific routine of the above-mentioned grouping process of data information, with reference to the flowchart.

Figure 17:
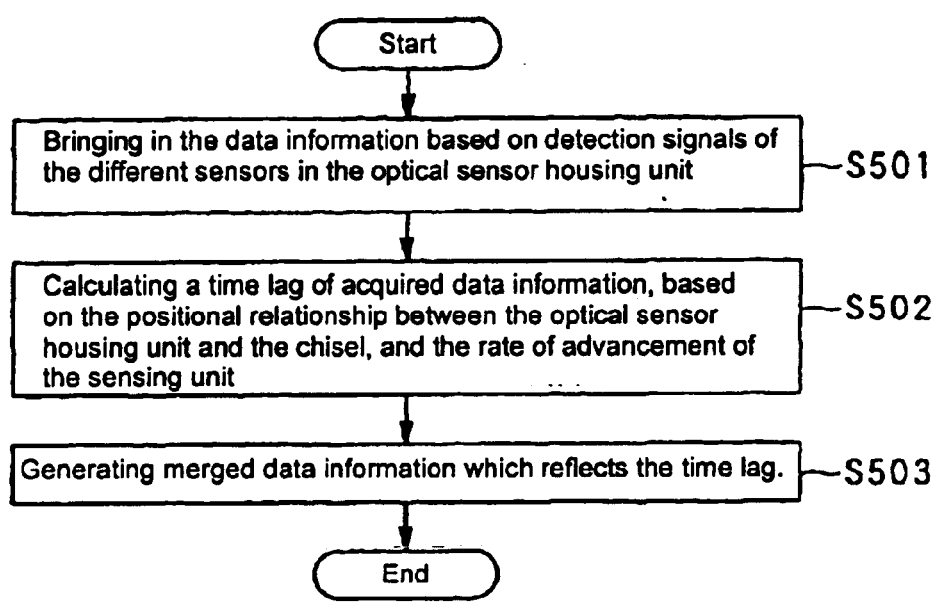
FIG. 17 shows a flowchart depicting a process routine for merging the data information based on the detection signals of the different sensors in the fourth embodiment of the present invention.

FIG. 17 shows a flowchart depicting the routine for merging the soil characteristics information acquired based on the detection signals of the different sensors. The routine shown in this flowchart is included in, e.g., Step S104 in the previous basic routine (FIG. 7) as a part of the process implemented by the computer 150 of the soil characteristics survey device 10 or the like.

When the process goes into this routine, in Step S501, the computer 150 brings in data information based on the detection signals of the different sensors in the optical sensor housing unit 60.

In Step S502 the time lag of acquired data information is calculated based on the positional relationship between the optical sensor housing unit 60 and the chisel unit 53, and the rate of advancement of the sensing unit.

In Step S503 while taking the time calculated in Step S502 into consideration, the data information based on the detection signals of the different sensors in the optical sensor housing unit 60 is extracted from the history of data information based on the detection signals of the electric characteristic sensor 57 and the soil hardness sensor 100. Then both data information are grouped as data information about the same soil sample and managed collectively.

Even if different soil samples (the target to be surveyed) are detected at any given timings due to different arrangement of the sensor elements or different ground surfaces to be actually detected (e.g., difference between the soil excavating surface and the soil survey surface L2), the data corresponding to nearly the same soil sample can be securely acquired as collective data information about each soil characteristic and be managed collectively.

In place of the aforementioned control system with the routine, it is possible to adopt a control system that adjusts the time for each sensor to start data acquisition so that the different sensors having different relative distances can survey the same soil sample.

Figure 18:
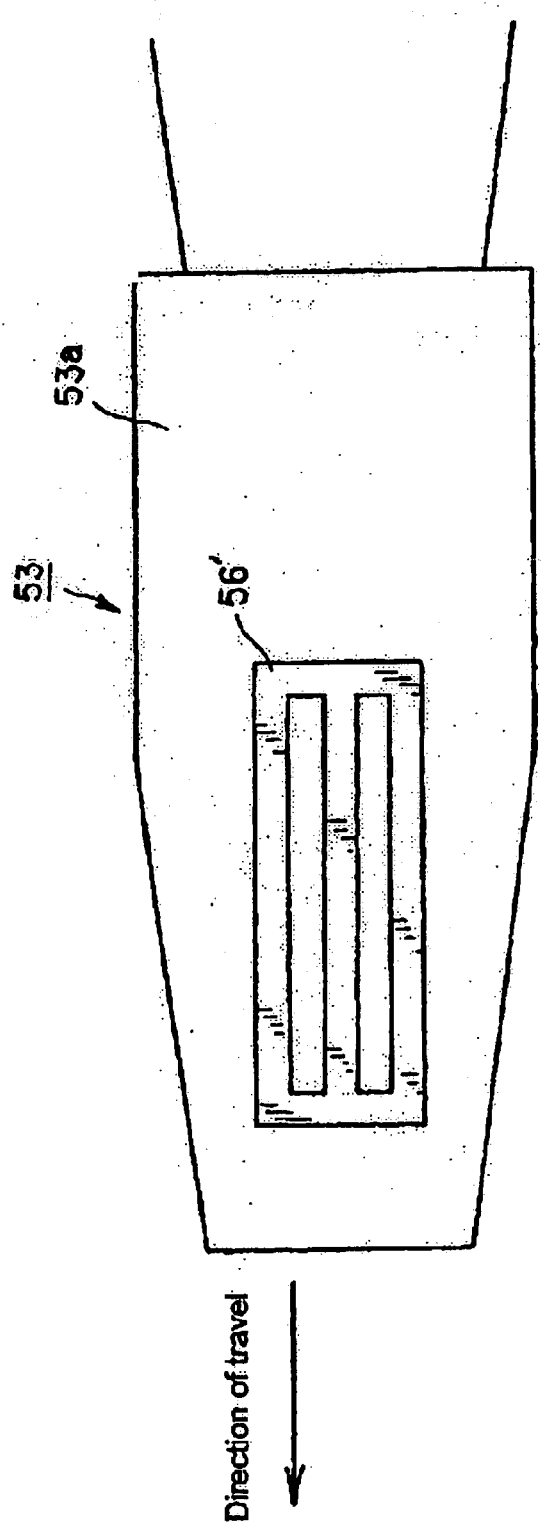
FIG. 18 shows a rough sketch of another embodiment of the soil characteristics survey device of the present invention.

In place of the structure of the electric characteristic sensor 57 of each of the aforementioned embodiments using the top surface 53a of the chisel unit 53 as electrodes, as shown in the top view of the chisel unit in FIG. 18, two different kinds of electrodes 55a, 55b enclosed by an insulating member can be disposed on the top surface 53a of the chisel unit 53 to detect electric conductivity or dielectric constant of the soil between these electrodes.

Figure 19:
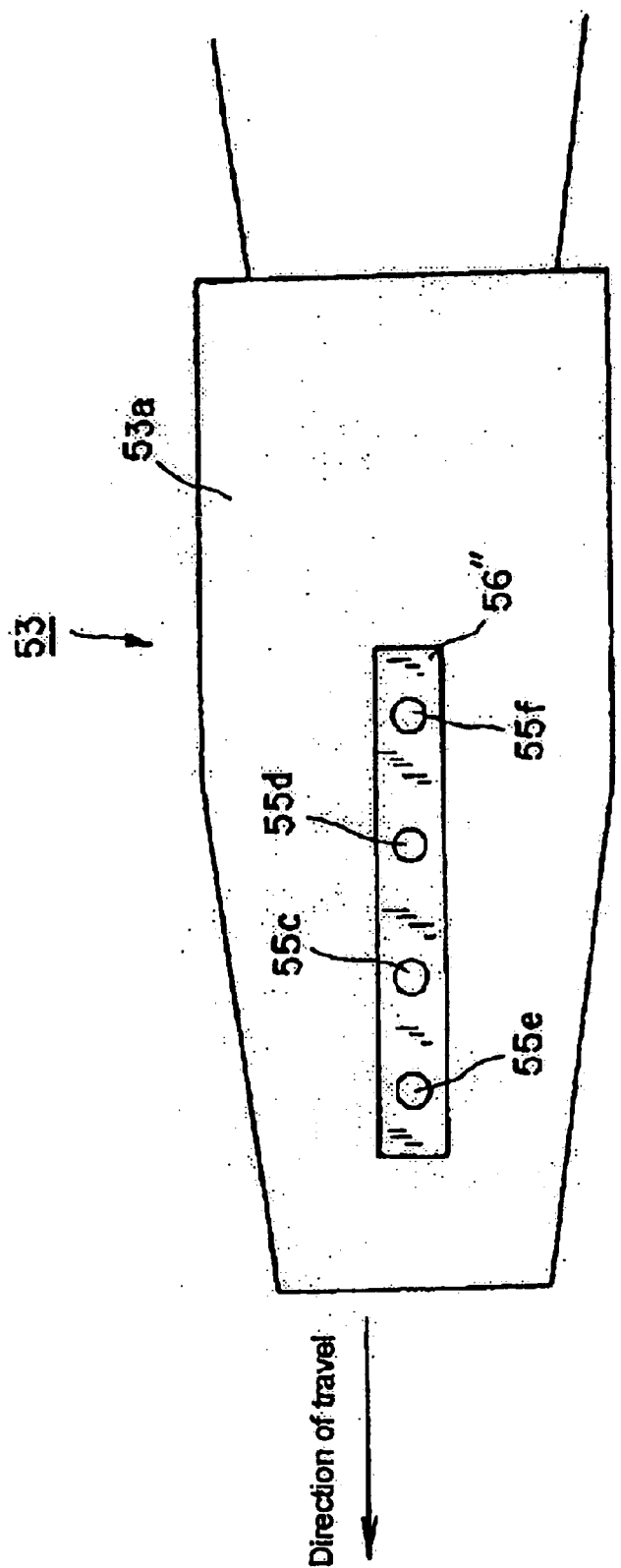
FIG. 19 shows a rough sketch of another embodiment of the soil characteristics survey device of the present invention.

It is also possible, as shown in FIG. 19 as the top view of the chisel unit, that four different electrodes 55c, 55d, 55e, and 55f enclosed by an insulating member are disposed on the top surface 53a of the chisel 53, and a pair of electrodes are adopted as voltage detection terminals (e.g., electrodes 55c, 55d), and the other pair of electrodes as current detection terminals (e.g., electrodes 55e, 55f) to enable the electric characteristics of the soil to be detected by 4-terminal method.

Figure 20:
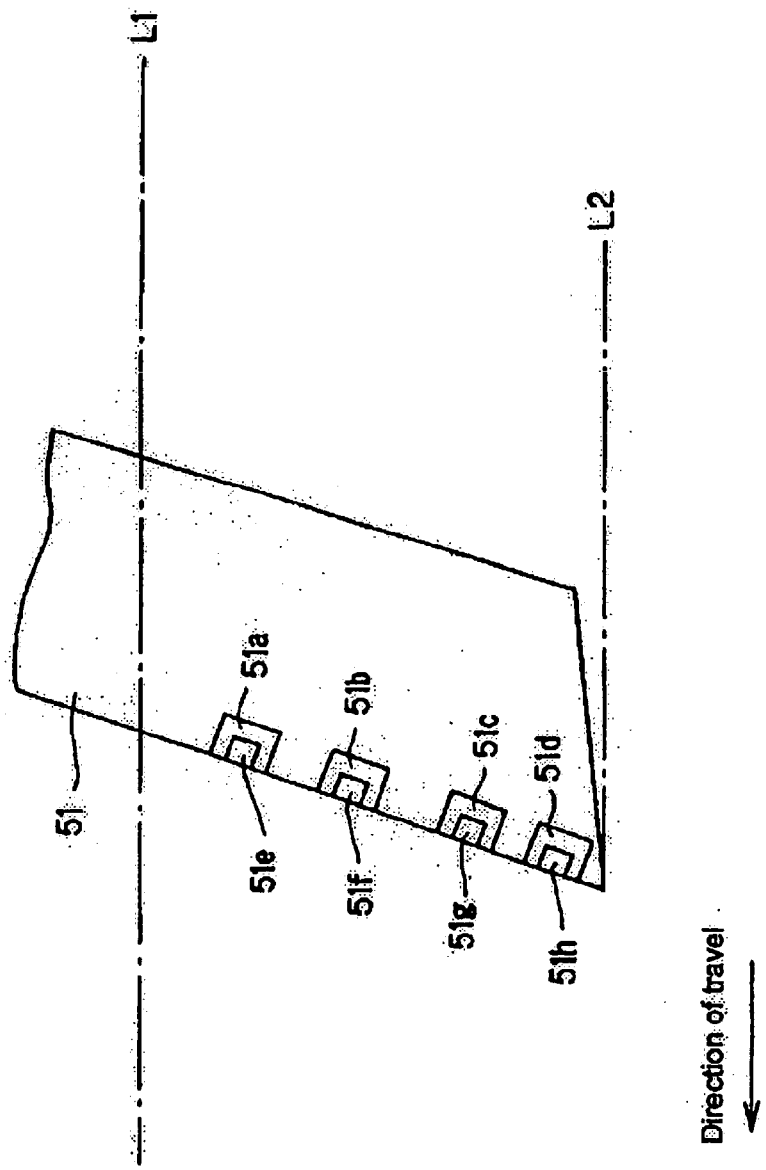
FIG. 20 shows a rough sketch of another embodiment of the soil characteristics survey device of the present invention.

It is also possible, as shown in FIG. 20 as a partial side view of the shank, that electrodes 51e, 51f, 51g, and 51h enclosed by insulating members 51a, 51b, 51c, and 51d, respectively, are arranged along the outer edge of the shank 51 (in different degrees of depth in the soil), and these electrodes are made use of so as to detect electric characteristics of the soil in different degrees of depth.

As described hereinbefore, according to the present invention, plural locations of data obtained in any given survey points as detection values about the characteristics of the soil can be merged accurately and efficiently as information corresponding to the same soil sample. As the result, helpful information for generating a data map with high universality to express the geographical distribution of the characteristics of the soil in a wide area can be collected efficiently.

What is claimed is:

1. A soil characteristics survey device for surveying soil characteristics, comprising:

a soil excavator for excavating and moving into a soil while making its excavating surface contact the soil at a predetermined depth, and forming a survey space proximate a rear end of the soil excavator;

a detecting device;

a distance sensing device; and a distance corresponding device, wherein said detecting device measures characteristics on a survey surface which is at an interface between the survey space and the soil, said distance sensing device a distance from said detecting device to the survey surface, and said distance corresponding device processes the soil characteristics detected by said detecting device, according to the distance measured by said distance recognizing device.

2. The soil characteristics survey device of claim 1, wherein said distance corresponding device comprises:

an unevenness sensing device for detecting unevenness of the survey surface based on the distance measured by said distance sensing device; and a grouping processor for grouping information about the soil characteristics detected by said detecting device based on the unevenness detected by said unevenness sensing device.

3. The soil characteristics survey device of claim 1, wherein the soil characteristics detected by said detecting device include optical characteristics based on light reflected from the survey surface.

4. A soil characteristics survey device for surveying soil characteristics, comprising:

a soil excavator for excavating and moving into a soil while making its excavating surface contact the soil at a predetermined depth; and a detecting device for detecting electric characteristics of the soil in contact with the excavating surface, wherein said detecting device includes at least a pair of electrodes which are disposed on a surface of the soil excavator and isolated from each other, and wherein said detecting device includes a voltage supply circuit for supplying an alternating voltage of a predetermined frequency to said pair of electrodes.

5. The soil characteristics survey device of claim 4, wherein said voltage supply circuit includes:

a first voltage supply circuit for supplying an alternating voltage of a first frequency to said pair of electrodes; and a second voltage supply circuit for supplying an alternating voltage of a second frequency.

6. A soil characteristics survey device for surveying soil characteristics, comprising:

a soil excavator for excavating and moving into a soil while making its excavating surface contact the soil at a predetermined depth, and forming a survey space proximate a rear end of the soil excavator;

a detecting device;

a measurement condition sensing device; and a group information generator, wherein said detecting device measures the soil characteristics of at least one soil selected from the group consisting of the soil on the survey surface and the soil in contact with the excavating surface, said measurement condition sensing device detects measurement conditions when said detecting device detects the soil characteristic at a plurality of locations, and said group information generator generates groups of data each corresponding to a substantially identical soil sample, based on the measurement conditions detected by said measurement condition sensing device.

7. The soil characteristics survey device of claim 6, wherein the measurement conditions detected by said measurement condition sensing device include a timing at which the soil characteristics of the plurality of locations are detected and a rate of movement of said soil excavator.

8. The soil characteristics survey device of claim 6, wherein said detecting device is configured to measure the soil characteristics of both the soil on the survey surface and the soil in contact with the excavating surface.

9. The soil characteristics survey device of claim 8, wherein the soil on the survey surface and the soil in contact with the excavating surface correspond to substantially the same soil sample.

10. The soil characteristics survey device of claim 9, further comprising a comparator for comparing, based on the soil characteristics of at least one of the soil on the survey surface and the soil in contact with the excavating surface, reliability of the soil characteristics of another soil sample.

11. The soil characteristics survey device of claim 1, further comprising:

a communicator; and a processor, wherein said communicator acquires information about a current position of the soil characteristics survey device as external communication information, and said processor processes the external communication information and the soil characteristics detected by said detecting device as related data information.

12. The soil characteristics survey device of claim 6, further comprising:

a communicator, and a processor, wherein said communicator acquires information about a current position of the soil characteristics survey device as external communication information, and said processor processes the external communication information and the soil characteristics detected by said detecting device as related data information.

* * * * *